(12) United States Patent
Berger et al.

(10) Patent No.: US 11,117,754 B2
(45) Date of Patent: Sep. 14, 2021

(54) METHOD AND APPARATUS USED TO HANDLE NON-UPRIGHT ARTICLES OF AN ARTICLE STREAM UNDER PREVENTION OF DISTURBANCES

(71) Applicant: Krones Aktiengesellschaft, Neutraubling (DE)

(72) Inventors: Simon Berger, Koenigsbrunn (DE); Richard Eschlbeck, Vogtareuth (DE); Thomas Hensel, Aying (DE); Herbert Spindler, Niedermoosen (DE); Martin Bauer, Nussdorf am Inn (DE); Lucas Kiefer, Augsburg (DE); Georg Goetz, Augsburg (DE)

(73) Assignee: KRONES Aktiengesellschaft, Neutraubling (DE)

( * ) Notice: Subject to any disclaimer, the term of this patent is extended or adjusted under 35 U.S.C. 154(b) by 38 days.

(21) Appl. No.: 16/620,038

(22) PCT Filed: Jun. 12, 2018

(86) PCT No.: PCT/EP2018/065555
§ 371 (c)(1),
(2) Date: Dec. 6, 2019

(87) PCT Pub. No.: WO2018/229077
PCT Pub. Date: Dec. 20, 2018

(65) Prior Publication Data
US 2020/0095067 A1      Mar. 26, 2020

(30) Foreign Application Priority Data

Jun. 13, 2017  (DE) ..................... 10 2017 209 984.4

(51) Int. Cl.
*B65G 47/24* (2006.01)
*B65G 47/244* (2006.01)
(Continued)

(52) U.S. Cl.
CPC .......... *B65G 47/24* (2013.01); *B65G 47/244* (2013.01); *B65G 47/256* (2013.01);
(Continued)

(58) Field of Classification Search
CPC .... B65G 47/24; B65G 47/244; B65G 47/256; B65G 47/914
(Continued)

(56) References Cited

U.S. PATENT DOCUMENTS 3,433,966 A * 3/1969 Letch .................... G08B 21/187
                                                     250/223 B
3,730,325 A * 5/1973 Goodwin .................. B07C 5/02
                                                     198/395

(Continued)

FOREIGN PATENT DOCUMENTS

EP    2479123 A1    7/2012
EP    2796393 A1    10/2014
(Continued)

OTHER PUBLICATIONS

US 2020/0048012 A1, Andreoli et al., Feb. 13, 2020.*
(Continued)

*Primary Examiner* — Douglas A Hess
(74) *Attorney, Agent, or Firm* — Simmons Perrine Moyer Bergman PLC

(57) ABSTRACT

The invention includes a method (100) and an apparatus to handle irregularly conveyed and/or irregularly aligned and/or non-upright articles of an article stream under prevention of disturbances. The method (100) comprises the following steps: identifying at least one non-upright article in an article stream as an error; performing a correction step to resolve the error, the correction step comprising removal from the article stream of the at least one irregularly aligned article, or transfer to an upright orientation of the at least one (Continued)

irregularly aligned article, with a defined action being exerted temporally before and/or in temporal overlap with the correction step upon the at least one irregularly aligned article or upon regularly conveyed articles of the article stream.

25 Claims, 17 Drawing Sheets

(51) Int. Cl.
 *B65G 47/256* (2006.01)
 *B65G 47/91* (2006.01)
(52) U.S. Cl.
 CPC .... *B65G 47/914* (2013.01); *B65G 2201/0235* (2013.01); *B65G 2203/025* (2013.01); *B65G 2203/0225* (2013.01); *B65G 2203/0291* (2013.01); *B65G 2811/0626* (2013.01); *B65G 2811/0678* (2013.01)
(58) Field of Classification Search
 USPC .......... 198/376, 379, 380, 395, 379.06, 399, 198/416, 464.4
 See application file for complete search history.

(56) References Cited

U.S. PATENT DOCUMENTS

| | | | | |
|---|---|---|---|---|
| 4,354,865 A * | 10/1982 | Poad | ...................... | B07C 5/122 |
| | | | | 209/3.2 |
| 4,494,656 A * | 1/1985 | Shay | ........................ | G01V 8/12 |
| | | | | 209/524 |
| 4,915,209 A * | 4/1990 | Canziani | ................ | B65G 43/08 |
| | | | | 198/357 |
| 5,531,310 A * | 7/1996 | Itoh | ........................ | B65G 47/24 |
| | | | | 198/395 |
| 5,734,467 A * | 3/1998 | Lucas | ..................... | B07C 5/126 |
| | | | | 209/524 |
| 6,025,910 A * | 2/2000 | Lucas | ..................... | B07C 5/126 |
| | | | | 356/240.1 |
| 6,365,906 B1 * | 4/2002 | Spangenberg | ....... | B65G 47/256 |
| | | | | 250/223 B |
| 6,961,638 B2 * | 11/2005 | Ouellette | .............. | B07C 5/3408 |
| | | | | 198/395 |
| 7,556,137 B2 * | 7/2009 | Charpentier | .............. | B07C 5/02 |
| | | | | 198/369.7 |
| 10,023,398 B2 * | 7/2018 | Wilson | .................. | G01B 11/14 |
| 10,087,017 B2 | 10/2018 | Klotz | | |
| 2008/0226763 A1 | 9/2008 | Charpentier | | |
| 2016/0280460 A1 | 9/2016 | Porat | | |

FOREIGN PATENT DOCUMENTS

| | | |
|---|---|---|
| FR | 3019537 A1 | 10/2015 |
| GB | 1244294 A | 8/1971 |
| JP | H0367810 A | 3/1991 |
| JP | H03245885 A | 11/1991 |
| JP | H08197475 A | 8/1996 |
| JP | H09103983 A | 4/1997 |
| JP | 2014076618 A | 5/2014 |
| WO | 2012093932 A2 | 7/2012 |
| WO | 2015193351 A1 | 12/2015 |

OTHER PUBLICATIONS

Priority Application: DE 10 2017 209 984.4 filed Jun. 13, 2017—International Search Report dated Feb. 18, 2019.
Priority Application: DE 10 2017 209 984.4 filed Jun. 13, 2017—Partial International Search Report dated Nov. 12, 2018.
First Chinese Office Action dated Jul. 30, 2020.
English Translation of International Preliminary Report on Patentability from WIPO dated Dec. 26, 2019.
International Preliminary Report on Patentability from WIPO dated Dec. 26, 2019.

* cited by examiner

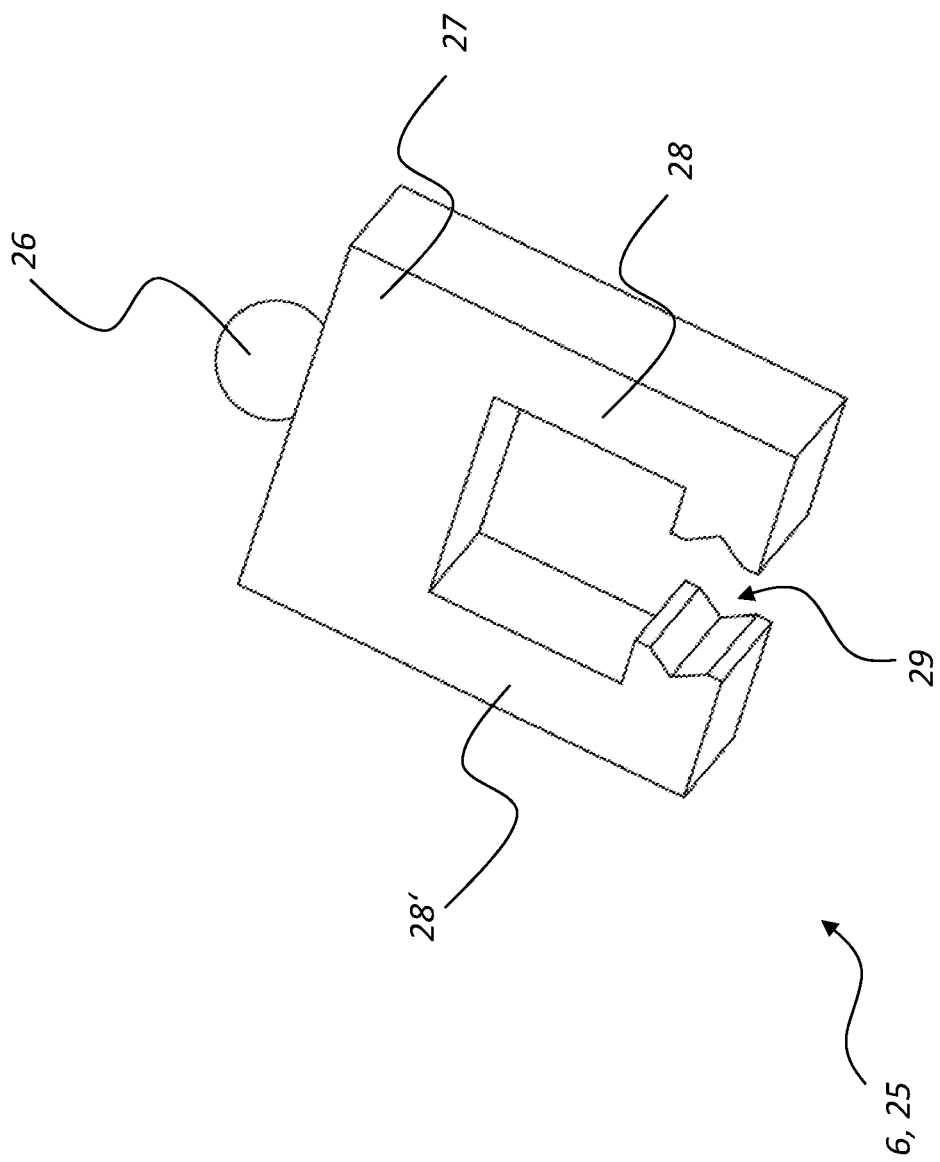

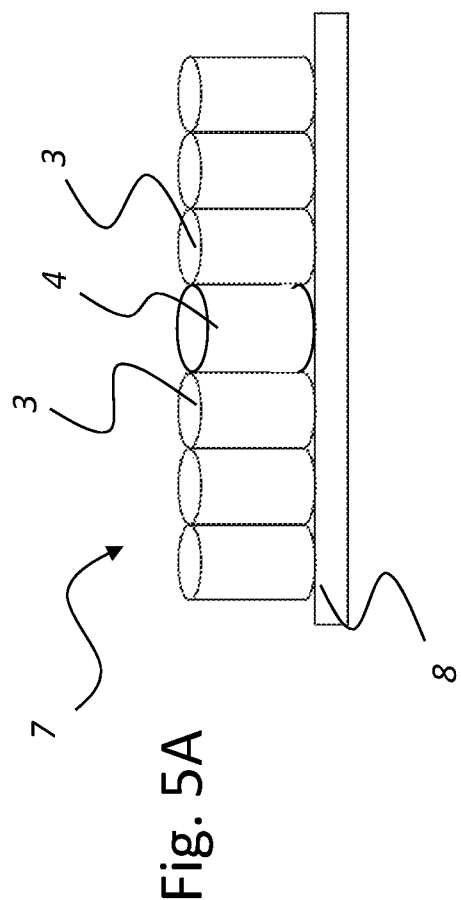
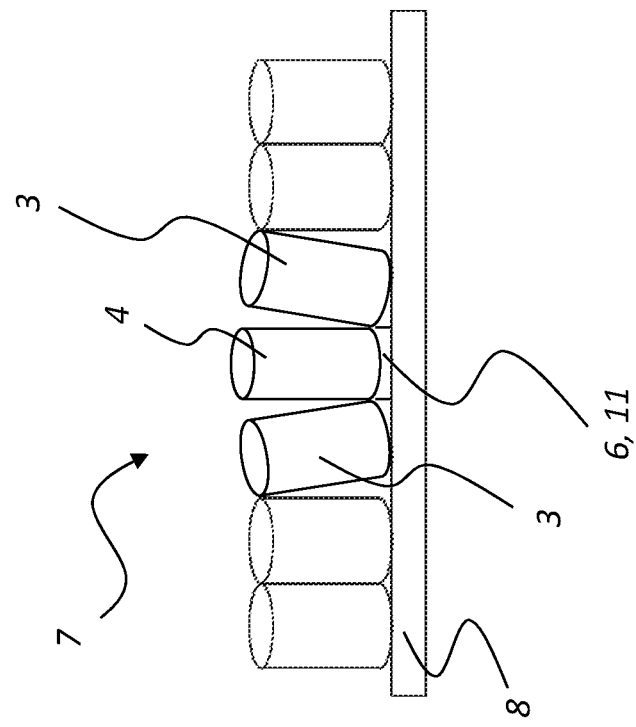

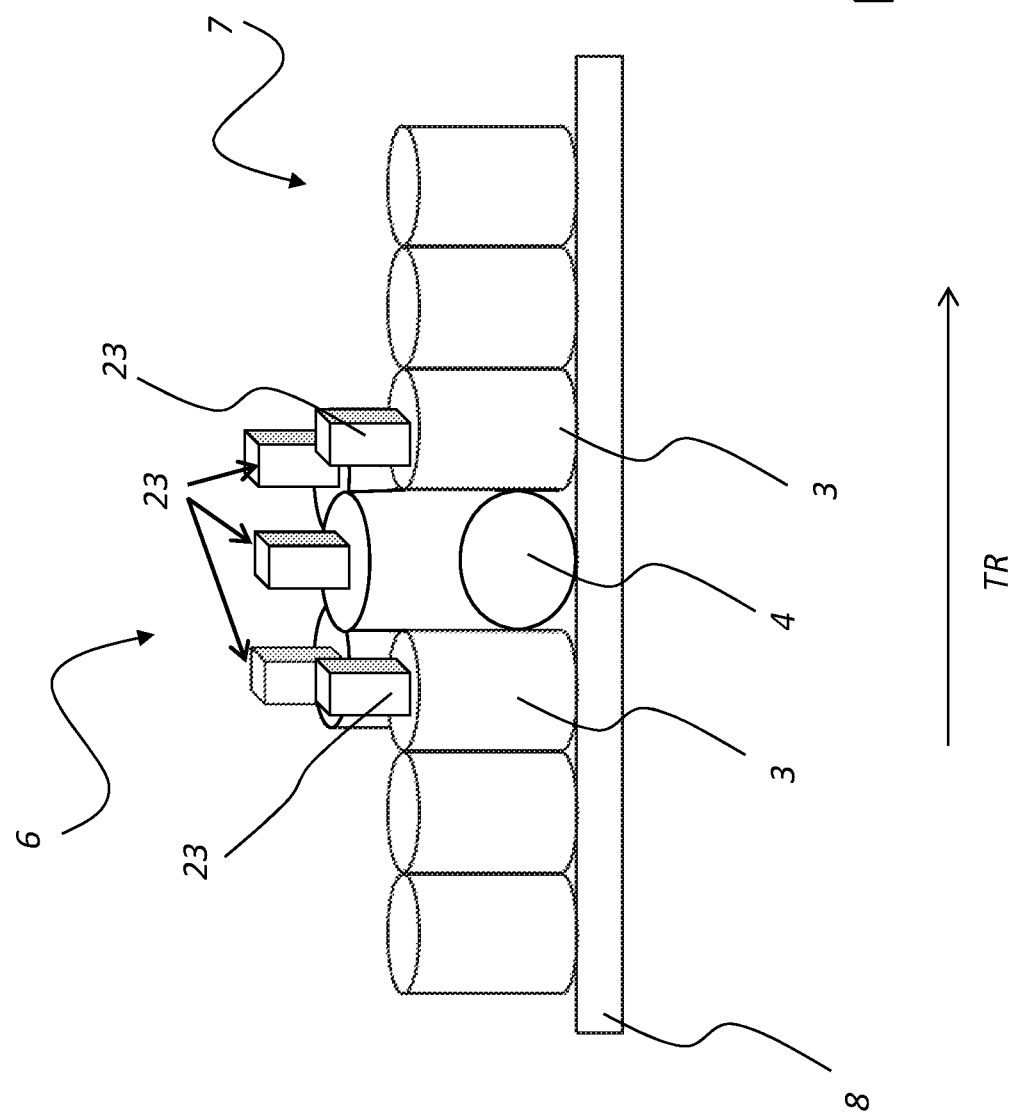

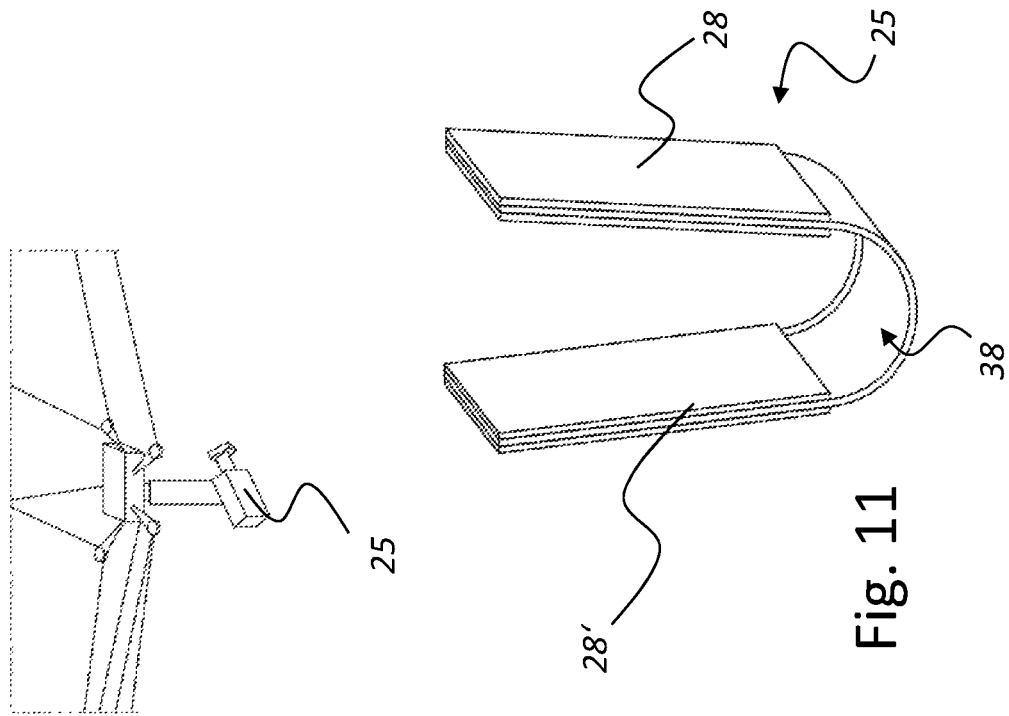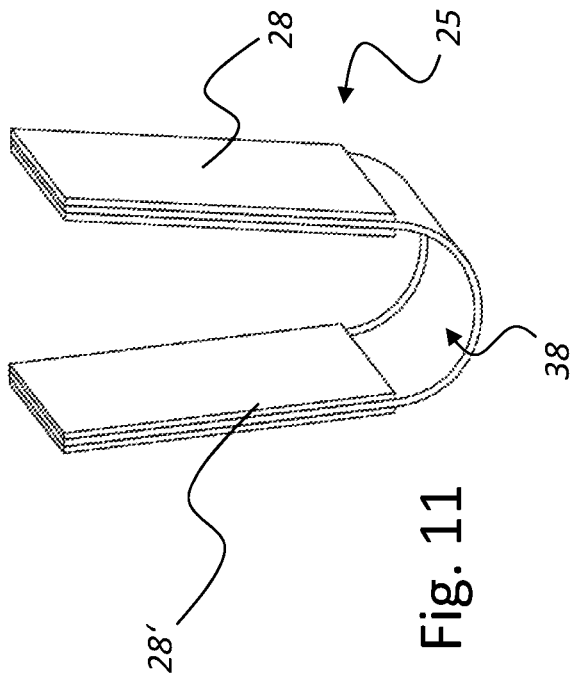
Fig. 10A  Fig. 10B  Fig. 10C  Fig. 11

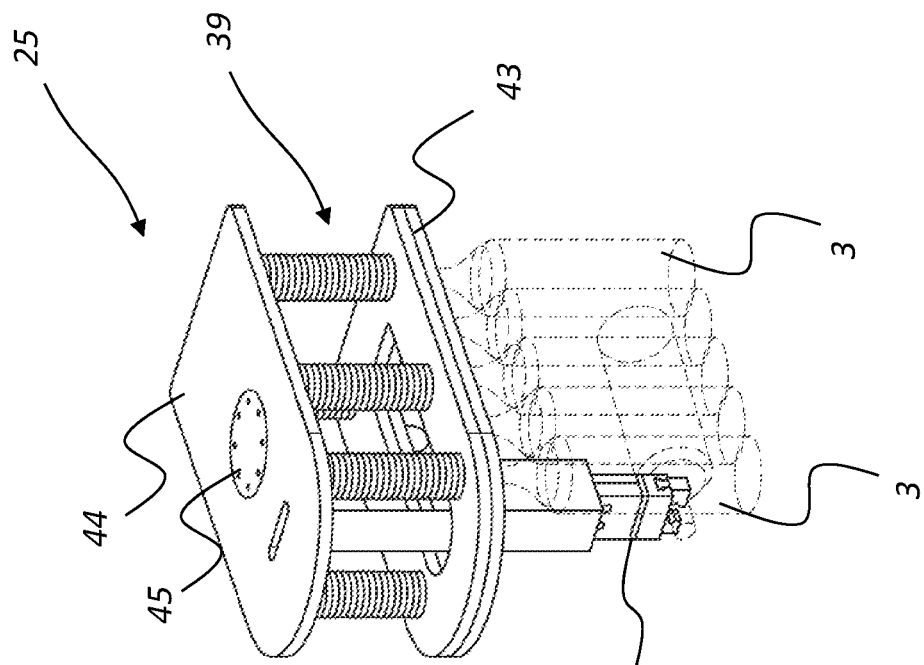
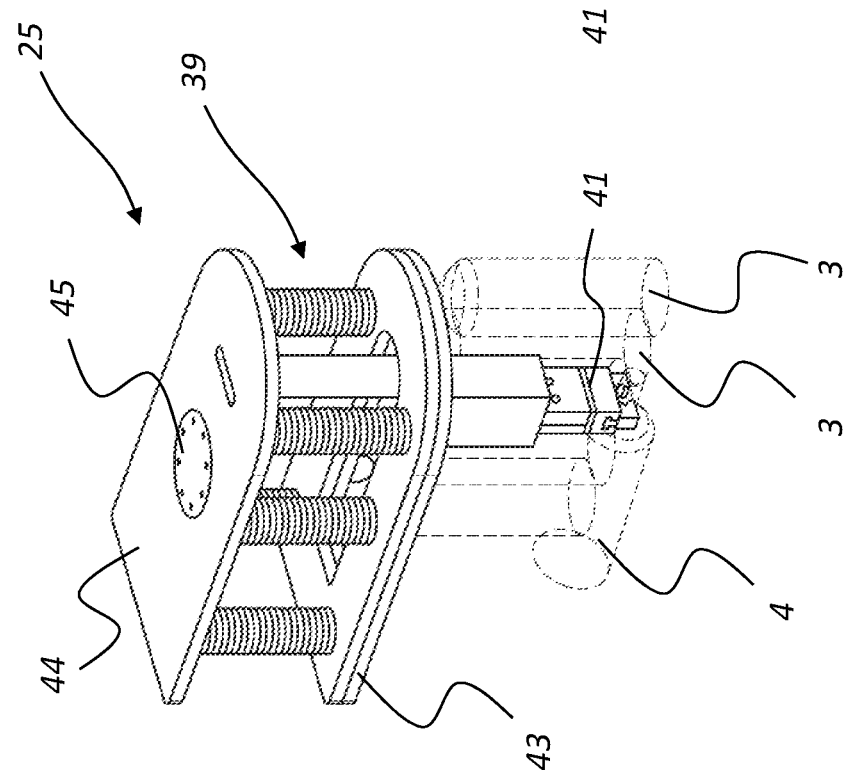
Fig. 12B
Fig. 12A

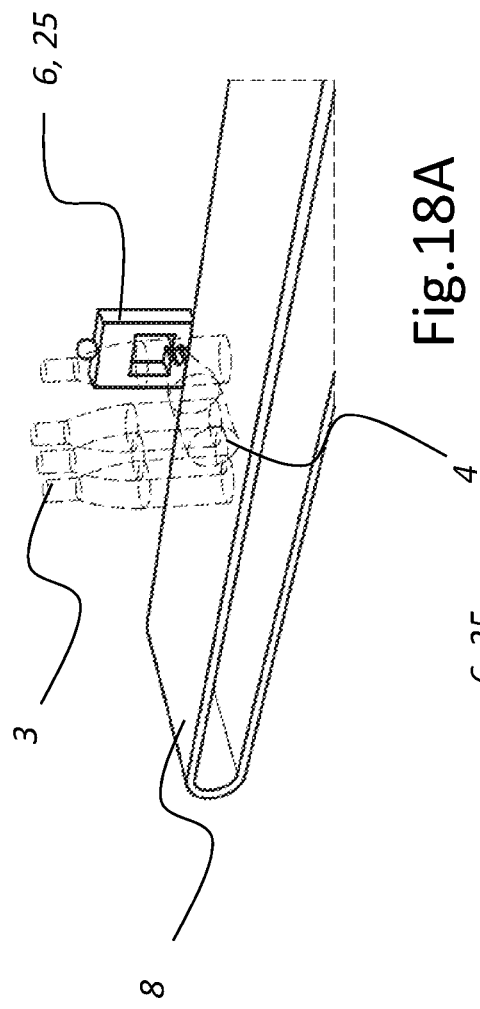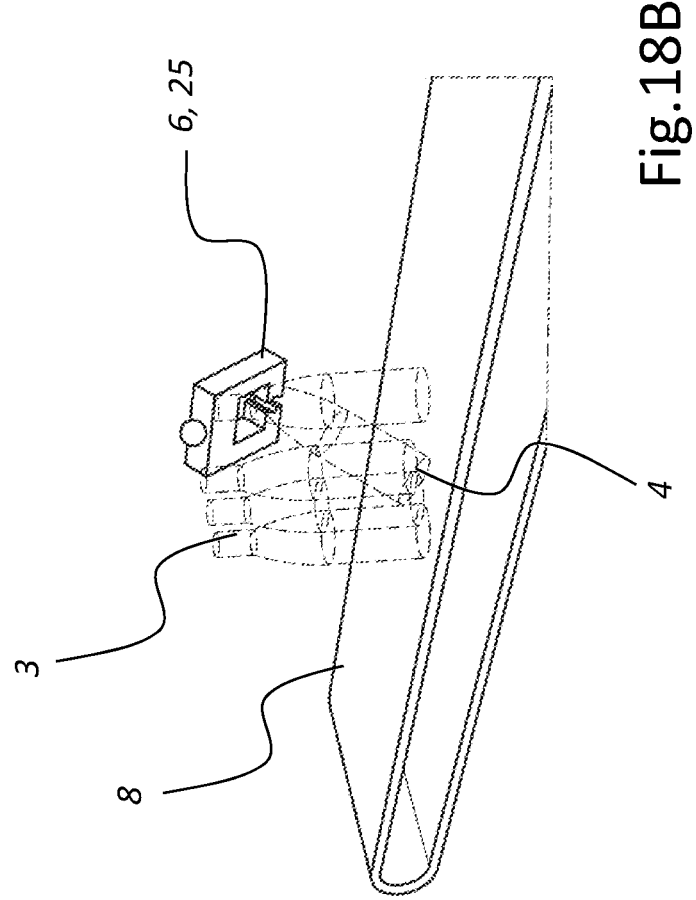

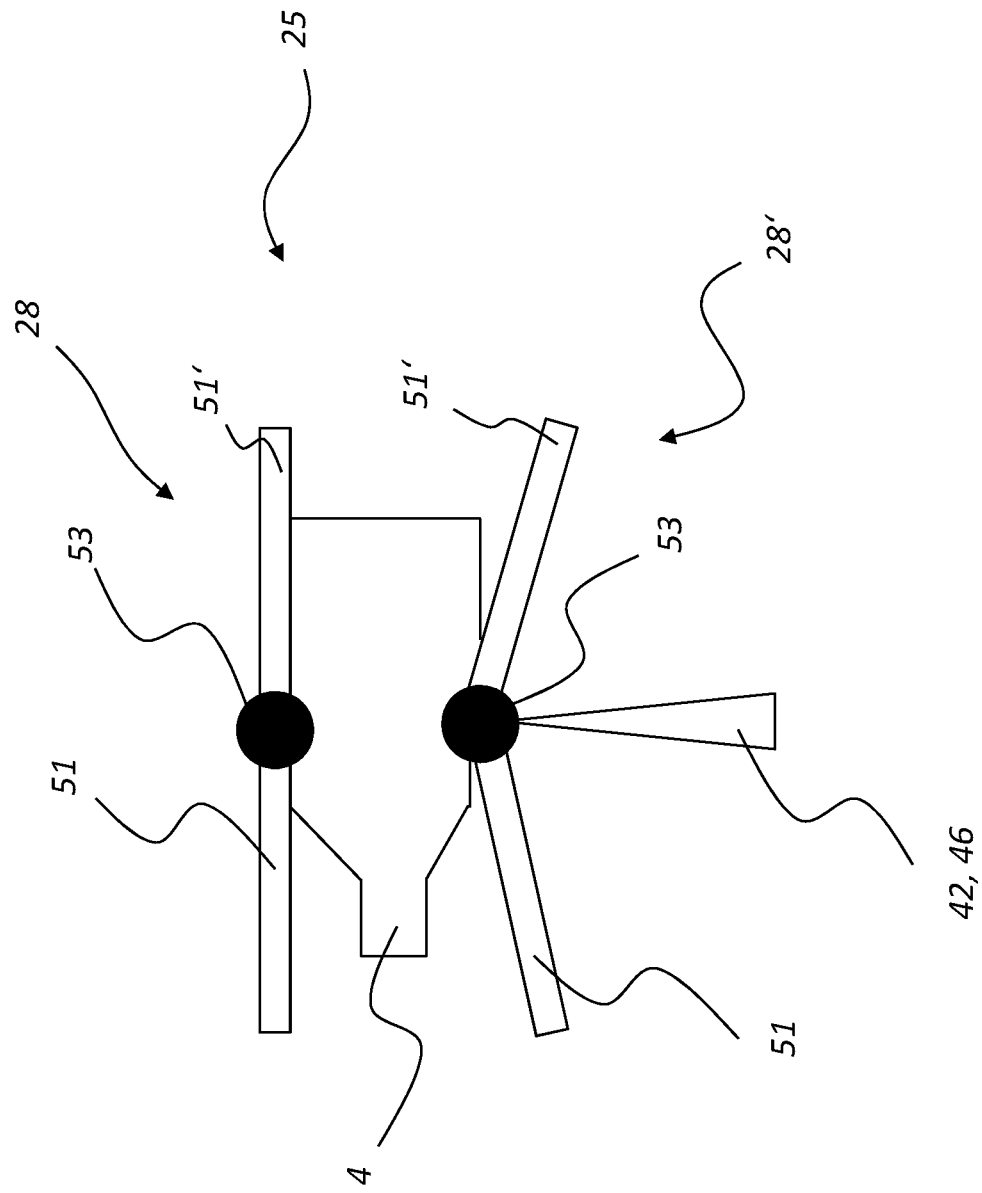

METHOD AND APPARATUS USED TO HANDLE NON-UPRIGHT ARTICLES OF AN ARTICLE STREAM UNDER PREVENTION OF DISTURBANCES

CLAIM OF PRIORITY

The present application claims priority to International Application PCT/EP2018/065555, filed Jun. 12, 2018, which in turn claims priority to German Application DE 10 2017 209 984.4, filed Jun. 13, 2017, which are incorporated by reference.

FIELD OF THE INVENTION

The present invention relates to a method used to handle irregularly conveyed and/or irregularly aligned and/or non-upright articles of an article stream, in particular, under prevention of disturbances of an article conveyance. The invention moreover relates to an apparatus used to transport articles and to handle irregularly conveyed and/or irregularly aligned and/or non-upright articles of an article stream.

BACKGROUND OF THE INVENTION

Articles, such as those designed as beverage containers, are frequently transported along a packaging line and in this connection provided with at least one outer packaging, if required. The articles provided with a particular outer packaging or the beverages containers gathered together in a particular bundle can then be brought into a particular pre-group aligned to a palletizable layer, from which pre-group the finished palletizable layer is produced by compacting the previously grouped articles or bundles. A multitude of palletizable layers can be stacked and prepared for transport on each particular pallet.

During the processing steps or during a herewith associated transport of articles, it is possible that an error occurs with individual articles or that they tilt over while being transported which involves problems in processing these articles and in continuing the individual work steps without interruption. In this connection, it can be necessary to stop individual machines or an entire facility or to briefly take it out of operation until a disturbance can be removed that was caused due to an individual article having tilted. Such tilted articles can be extracted from the particular processing line manually. In order not to have to interrupt individual processing steps, and in order to minimize staff effort for removing disturbances as much as possible, individual systems are known from the prior art that use a manipulator for this purpose.

Such a system is disclosed, for example, in WO 2015/185957 A1. The system described there comprises a horizontal conveying device on which a multitude of bottles is moved in a disorderly mass flow. A robot is disposed at the side of the horizontal conveying device. The robot can extract individual, tilted bottles of the disorderly mass flow from the horizontal conveying device or from the disorderly mass flow.

Practice has shown that additional problems can arise from an extraction or from a removal of errors caused by tilting of individual articles. It is possible, for example, that a plurality of further articles of the article stream are impaired or fall over while extracting the particular tilted article, and the further articles hereby come to lie in a likewise undesired manner on the horizontal conveying device. If a plurality of immediately adjacent articles or beverage containers have tilted over it is possible that a plurality of beverage containers lie partly on top of each other. Lower located articles or beverage containers are potentially non-accessible in this connection, thus involving further problems for an extraction. In the instance of beverage containers, a particular tilted beverage container is frequently sensor-detected, with a position of the label applied onto the particular beverage container being optically identified. If a plurality of beverage containers have tilted and hereby lie on top of each other, the label of a lower located beverage container is potentially non-identifiable, or it is covered by further beverage containers lying on top. The lower located, tilted beverage container can then not be identified as being a tilted beverage container or as being an error and is thus not extracted.

If the multitude of articles is moved in back pressure, and if the individual articles of the multitude consist of plastic or PET tilted articles are potentially inadvertently deformed, thus involving further problems when extracting the particular article. Due to the back pressure, individual tilted beverage containers can hereby be held, for example, in a clamping manner between further, upright beverage containers such that the particular tilted beverage container cannot, or only with difficulties, be extracted from the article stream; and in the process it can frequently become inadvertently disengaged from a handling device provided for the extraction.

In this way, there are numerous problems in practice in the instance of having to remove an error in an article stream caused by a particular non-upright article. Such errors can, in particular, require an interruption of an ongoing packaging operation as well as a manual intervention in order for it to be possible to remove problems in the transport of an article stream.

A primary object of the invention can therefore be seen in providing a possibility by which an error can be removed that was formed or caused by a non-upright article, and by which the currently existing and above-described problems associated with the removal of the error can be at least partly counteracted. Such a removal, in which the currently existing problems are counteracted, is intended to be made possible by an apparatus that has a simple construction. In addition, such a removal, in which the currently existing problems are counteracted, is intended to be made possible by a method that can be easily performed.

The above objects are solved by a method and an apparatus comprising the features in the independent claims. Further advantageous embodiments of the invention are described in the subclaims.

SUMMARY OF THE INVENTION

The invention relates to a method used to handle non-upright articles of an article stream under prevention of disturbances. The non-upright articles of the article stream can be formed by beverage containers or bottles that have inadvertently tilted or the longitudinal axes of which are inclined in relation to a vertical. It is also possible for the non-upright articles to be formed by cans that are not standing upright or the particular longitudinal axes of which are inclined in relation to a vertical. "Irregularly aligned", "non-upright articles" or "articles conveyed in a non-upright position" are frequently referred to in the context of the following description, this phrasing is generally to be understood in a comprehensive sense, and generally relates to all comparable disturbances, such as irregularly conveyed and/or irregularly aligned and/or non-upright articles of an article stream, that is to say, all articles in an article stream that are not in an intended target orientation or target alignment, while the other articles of the article stream are being conveyed in this target orientation or target alignment or "regularly conveyed.".

Other articles of the article stream can be in a regular or upright orientation or in a target orientation and thus not form an error in the article stream. It is possible that the individual upright articles as well as the non-upright article in the article stream, are moved by back pressure. Hereby, a plurality of upright articles immediately adjacent to the non-upright article can abut on the non-upright article by force application. The non-upright article can thus be fixedly located in a clamping manner in the article stream by immediately adjacent articles, which can involve problems to be described below for the currently existing apparatuses or methods in the instance of a potential extraction of the non-upright article.

It is provided that at least one irregularly conveyed and/or irregularly aligned and/or non-upright article in an article stream is identified as an error. The article stream together with the particular at least one non-upright article can pass at least one sensor system with the at least one non-upright article in the process moving into a detection range of the at least one sensor system and being identified in the detection range of the at least one sensor system by the at least one sensor system as a non-upright article or as a tilted beverage container. In various embodiments, the at least one sensor system can comprise at least on camera system, which is designed to identify the particular at least one non-upright article in the article stream as an error. The at least one sensor system or the at least one camera system can be in communication with a control unit and/or regulating unit, which, with the help of the at least one camera system or of the at least one sensor system can verify or determine whether a particular non-upright article is located in the article stream or whether there is an error present in the article stream. Embodiments have proved successful in which all articles of the article stream pass a detection range of the at least one sensor system.

A further step relates to performing a correction step to resolve the error, the correction step consisting of a removal from the article stream of the at least one article identified as being in a non-upright position, or of a transfer to an upright orientation of the particular at least one article identified as being in a non-upright position. It is possible that the article identified as being in a non-upright position is discharged in the context of the removal from the article stream. A handling device can be provided for this purpose, which receives or seizes the article identified as being in a non-upright position, lifts it temporally following hereafter in an upward direction, and moves it away from the article stream. If required, the handling device can transfer the article identified as being in a non-upright position and discharged from the article stream into a container or place it on a deposit. It is also possible that the handling device discharges the article identified as being in a non-upright position from the article stream, hereafter transfers it to an upright orientation, and places it into a space in the article stream in the upright orientation and/or places at a specific location into the article stream in the upright orientation.

In the context of various embodiments, it is also conceivable that at least one horizontal discharge track is provided for the at least one article identified as being in a non-upright position, which discharge track connects to a transport path provided for the article stream. In the context of the removal, the article identified as being in a non-upright position can be discharged from the article stream by the discharge track, as the case may be.

It is provided that a defined action is exerted temporally before and/or in temporal overlap with the correction step upon the at least one article identified as being in a non-upright position and/or upon further, upright articles of the article stream, the defined action being aimed at preventing disturbances while performing the correction step. An intelligent logic to perform the defined action temporally before and/or in temporal overlap with the correction step can be stored on a control unit and/or regulating unit, which specifies a particular defined action when required or upon identifying a non-upright article in the article stream as an error.

In preferred embodiments, it can be provided that the defined action upon the at least one article identified as being in a non-upright position and/or upon further articles of the article stream is exerted in such a manner that an abutment by force application and caused, in particular, by back pressure, which abutment is formed between the at least one article identified as being in a non-upright position and at least one further, upright article of the article stream, is completely undone. The at least one further, upright article can immediately precede and/or immediately succeed the at least one article identified as being in a non-upright position in a movement direction of the at least one article identified as being in a non-upright position. In this context it is in particular possible that the at least one article identified as being in a non-upright position is moved relative to the at least one further, upright article of the article stream and hereby loses its abutment by force application and caused, in particular, by back pressure, on the at least one further upright article of the article stream.

Additionally or alternatively to this, it is possible that an abutment by force application and caused, in particular, by back pressure, which abutment is formed between the at least one article identified as being in a non-upright position and at least one further, upright article of the article stream, is at least reduced in terms of amount. For this purpose it is possible that the article stream is, for example, not moved or moved at reduced conveying speed over a specific time period during the correction step. The particular at least one article identified as being in a non-upright position can thus continue to be in abutment by force application on the at least one further, upright article of the article stream during the correction step. Due to the non-present movement of the article stream or to the movement of the article stream at reduced conveying speed, the abutment by force application of the at least one article identified as being in a non-upright position on the at least one further, upright article is, however, formed in a reduced manner.

It is conceivable that the article stream with the non-upright article or with the article identified as being in a non-upright position is guided over a plurality of horizontal conveying devices, with the plurality of horizontal conveying devices being controlled in a manner coordinated with one another, and with the abutment by force application and caused, in particular, by back pressure, which abutment is formed between the at least one article identified as being in a non-upright position and the at least one further, upright article of the article stream, hereby being completely undone or at least reduced in terms of amount. In particular, the plurality of horizontal conveying devices can be controlled in a manner coordinated with one another at different conveying speeds, with the abutment by force application and caused, in particular, by back pressure, which abutment is formed between the at least one article identified as being in a non-upright position and the at least one further, upright article of the article stream, being completely undone or at least reduced in terms of amount as a result herefrom.

It is thus possible that the article stream with the at least one non-upright article or with the at least one article identified as being in a non-upright position is guided over at least one horizontal conveying device that is operated at reduced conveying speed or stopped temporally while the correction step is being performed in order to reduce in terms of amount or in order to completely undo the abutment by force application caused, in particular, by back pressure.

It is also possible that one at least one further, regularly conveyed upright article is inclined in relation to the at least one non-upright article or to the at least one article identified as being in a non-upright position in order to reduce in terms of amount or in order to completely undo the abutment by force application caused, in particular, by back pressure. In this context, it is expediently possible that the at least one further, upright article is inclined in relation to the at least one article identified as being in a non-upright position in the opposite direction to the at least one article identified as being in a non-upright position. Embodiments have proved successful, in which the at least one article identified as being in a non-upright position is lifted up from a transport level formed for the article stream and is hereby staged for the correction step. The at least one further, upright article can be inclined in relation to the at least one article identified as being in a non-upright position in temporal overlap with the process of lifting up. For this purpose it is preferably possible for a molded part, to be described below and having a convexly curved outer cover surface, to dip from below into a transport level formed for the article stream in the area of the particular at least one article identified as being in a non-upright position, to lift up the at least one article identified as being in a non-upright position from a transport level formed for the article stream in the process, and to incline the at least one further, upright article in relation to the at least one article identified as being in a non-upright position in temporal overlap herewith.

Embodiments have also proved successful, in which at least one separator element is dipped in between the at least one non-upright article and at least one further article of the article stream, which at least one further article is preferably immediately adjacent to the at least one non-upright article, in order to reduce in terms of amount or in order to completely undo the abutment by force application caused, in particular, by back pressure. It is also conceivable that the at least one further article is decelerated or accelerated in relation to the at least one article identified as being in a non-upright position by the at least one separator element temporally after the process of dipping in. A longitudinal direction of the at least one separator element can extend transversely to a movement direction of the article stream. The at least one separator element can accompany the article stream over a specific time period temporally after the process of dipping into the article stream. It is possible that the at least one separator element forms a first lot with a multitude of articles and a second lot with a further multitude of articles from the article stream, with the multitude of articles of the first lot and the multitude of articles of the second lot being completely spaced apart from one another by the at least one separator element. By the spacing, the at least one article identified as being in a non-upright position can lose an abutment by force application on the at least one further, upright article of the article stream. After the described spacing, the at least one article identified as being in a non-upright position can be disposed in the first lot formed from the article stream, whereas the at least one further, upright article, which had formerly been in an abutment by force application on the at least one article identified as being in a non-upright position, is disposed in the second lot formed from the article stream.

It is furthermore conceivable that a vibration is applied to the at least one article identified as being in a non-upright position, with the result that the abutment by force application caused, in particular, by back pressure, on the at least one further, upright article is completely undone or reduced in terms of amount. Temporally during the vibration application, the at least one article identified as being in a non-upright position or the article stream can be moved along in an interruption-free manner.

The particular at least one article identified as being in a non-upright position can moreover be removed from the article stream in the context of the correction step, and it can be disintegrated into a plurality of parts for this purpose. It is possible that the at least one article identified as being in a non-upright position is mechanically disintegrated, in particular by a cutting impact, in the context of the correction step. At the onset of the cutting impact, the at least one article identified as being in a non-upright position can be standing on at least one horizontal conveying device provided to move the article stream. The plurality of parts, into which the at least one article identified as being in a non-upright position has been disintegrated, can be discharged from the article stream. It is possible that the plurality of parts, into which the at least one article identified as being in a non-upright position has been disintegrated, are, for example, extracted by suction from the article stream.

It is additionally possible that a content of the particular at least one article identified as being in a non-upright position, the content being in particular formed by liquid, is discharged at least partly from the particular at least one article identified as being in a non-upright position in the context of the defined action. For this purpose, at least one needle can be provided, which is inserted or pierced into the at least one article identified as being in a non-upright position. Following hereafter, it is additionally possible that a content of the particular at least one article identified as being in a non-upright position, the content being in particular formed by liquid, is in the context of the defined action discharged at least partly from the particular at least one article identified as being in a non-upright position by at least one opening formed as a part of the needle. After the content of the particular at least one article identified as being in a non-upright position, the content being in particular formed as liquid, has been discharged at least partly from the particular at least one article identified as being in a non-upright position in the context of the defined action, a mass of the particular article identified as being in a non-upright position with the liquid at least partly discharged is formed in a reduced manner in relation to a mass of the particular article identified as being in a non-upright position that is still completely filled. When the particular at least one article identified as being in a non-upright position is received by a seizing unit and removed from the article stream or transferred to an upright orientation, as will be described below, the article identified as being in a non-upright position with at least partly discharged liquid can with a high probability be prevented from inadvertently becoming disengaged from the seizing unit due to its mass because of the now reduced mass of the article identified as being in a non-upright position with at least partly discharged liquid.

It is furthermore conceivable that the at least one non-upright article is identified in a first conveyor section provided for the article stream and that the article stream is hereafter deflected together with the article identified as being in a non-upright position. Following the deflection, the article of the article stream identified as being in a non-upright position and having been deflected can be disposed in a further conveyor section, in which further conveyor section the article identified as being in a non-upright position and having been deflected is transferred to an upright orientation or is removed from the article stream in the context of the correction step. In the first conveyor section as well as in the further conveyor section, the article stream can be guided in directions oriented parallel to each other.

It is possible in the context of the defined action for at least one support element to be temporarily brought into abutment on at least one further, upright article of the article stream, which at least one further, upright article is preferably immediately adjacent to the at least one article identified as being in a non-upright position. In temporal overlap with the correction step, the at least one support element can hold the at least one further, upright article in its upright orientation. It is conceivable that the at least one support element is designed as a support plate, which is positioned on a plurality of upright articles, and which, in temporal overlap with the correction step, holds the plurality of upright articles in their upright orientation. The support plate can be positioned on the plurality of upright articles coming from above, and it can hold the plurality of upright articles in a clamping manner. A force used to hold the plurality of upright articles can be supplied for the support plate by at least one pressure spring.

It is also conceivable that the at least one support element is positioned on a top side of the at least one further, upright article and, in temporal overlap with the correction step, holds the at least one further, upright article under abutment on its top side in its upright orientation. In particular, a plurality of individual support elements can be provided in this context, with an own upright article being assigned to each support element and the particular support element being positioned onto the particular own upright article, the particular support element holding in temporal overlap with the correction step the particular own upright article under abutment on its top side in its upright orientation.

It can furthermore be provided that the particular at least one article identified as being in a non-upright position is received in the context of the correction step by at least one seizing unit and hereafter discharged from the article stream by a lifting movement caused by the at least one seizing unit. In temporal overlap with the lifting movement, the at least one seizing unit can at least temporarily, under abutment, and preferably laterally, support an upright article, which immediately succeeds and/or precedes in movement direction of the article stream the particular received article identified as being in a non-upright position. The at least one article identified as being in a non-upright position and/or further, upright articles of the article stream can be moved along in an interruption-free manner temporally during the correction step or temporally during the lifting movement caused by the at least one seizing unit.

It is moreover possible that the at least one seizing unit has at least two shanks located opposite each other and preferably designed as clamping elements and/or gripping elements, which at least two shanks located opposite each other and preferably designed as clamping elements and/or gripping elements:

dip into the article stream in order to receive the particular at least one article identified as being in a non-upright position, and, following hereafter, increase their relative distance from each other, with the at least two shanks located opposite each other and preferably designed as clamping elements and/or gripping elements moving away a particular upright article, which is adjacent to the at least one article identified as being in a non-upright position, from the at least one article identified as being in a non-upright position, and, temporally following hereafter; with the at least two shanks located opposite each other and preferably designed as clamping elements and/or gripping elements decreasing their relative distance from each other and receiving the particular at least one article identified as being in a non-upright position in a form-fitting and/or force-locking manner.

Hereby it is possible to minimize the risk of inadvertent tilting of upright articles.

Embodiments have proved successful in which the at least one article identified as being in a non-upright position is clasped in the context of the correction step in a form-fitting manner, at least in sections, by the at least one seizing unit, and is hereafter discharged from the article stream by the lifting movement. In particular, the at least one article identified as being in a non-upright position can be clasped in the context of the correction step in a form-fitting and non-rotating manner, at least in sections, by the at least one seizing unit, and can hereafter be discharged from the article stream by the lifting movement.

It can be provided that the at least one seizing unit has an air cushion that is brought in abutment on the particular at least one article identified as being in a non-upright position in order to receive the particular at least one article identified as being in a non-upright position. In this context, the at least one seizing unit can be moved toward the particular at least one article identified as being in a non-upright position. Temporally following hereafter, the air cushion can be pneumatically filled via compressed air, which involves the at least one article identified as being in a non-upright position to be fixedly located at the at least one seizing unit by the air cushion filled with compressed air. After removal of the at least one article identified as being in a non-upright position from the article stream, the compressed air can be discharged from the air cushion, which involves the at least one article identified as being in a non-upright position to leave the seizing unit.

The at least one seizing unit can also be disposed in a suspended manner from a gantry system and can be moved along the gantry system in order to receive the particular at least one article identified as being in a non-upright position and/or in order to discharge from the article stream the particular at least one article identified as being in a non-upright position. The gantry system can be designed in such a manner that the at least one seizing unit can be moved along the gantry system in different horizontal spatial directions.

In various embodiments, the at least one seizing unit can furthermore be moved by a parallel kinematic robot in order to receive the particular at least one article identified as being in a non-upright position and/or in order to discharge from the article stream the particular at least one article identified as being in a non-upright position. The parallel kinematic robot can have at least three working arms that are controllable in a manner coordinated with one another in order to move the at least one seizing unit. The parallel kinematic robot can thus be designed as a tripod, for example.

Moreover, embodiments have proved successful, in which the at least one seizing unit is in communication with a rope system and is moved in order to receive the particular at least one article identified as being in a non-upright position as well as in order to discharge from the article stream the particular at least one received article identified as being in a non-upright position. The rope system can comprise a multitude of ropes or a kinematics which are operated in a manner coordinated with one another in order to move the at least one seizing unit.

It is also possible that the at least one seizing unit can be moved by at least one unmanned aircraft in order to receive the particular at least one article identified as being in a non-upright position and in order to discharge from the article stream the particular at least one received article identified as being in a non-upright position. The at least one unmanned aircraft can have at least two rotors or propellers preferably disposed in a common horizontal plane and in each instance acting in a vertically downward direction, the rotors or propellers interacting with each other in order to move the at least one unmanned aircraft. The unmanned aircraft can be designed as quadrocopter, for example. It is also possible for the at least one unmanned aircraft to be in communication with a control unit and/or regulating unit that can control the at least one unmanned aircraft to receive the particular at least one article identified as being in a non-upright position and in order to discharge from the article stream the particular at least one received article identified as being in a non-upright position.

Furthermore, embodiments have proved successful, in which at least two separate sensor units are provided, which interact with each other in order to identify the at least one non-upright article in the article stream as an error. The at least two separate sensor units can be positioned offset to each other along a transport path provided for the article stream. It is conceivable that detection ranges of the at least two separate sensor units overlap at least in some areas. It is also possible that detection ranges of the at least two separate sensor units do not overlap or that they are completely offset to each other.

In conceivable embodiments it is possible that the at least one seizing unit penetrates into the particular at least one article identified as being in a non-upright position in order to receive the at least one article identified as being in a non-upright position, and that the seizing unit discharges from the article stream the particular at least one article identified as being in a non-upright position, into which article it has penetrated.

The at least one seizing unit can have, for example, a lengthwise shaft or carrier with a preferably sharp-edged tip being fixedly located in the end area of the lengthwise shaft or carrier.

Embodiments have also proved successful in which the at least one seizing unit has a piercing area with at least one needle and preferably with a multitude of needles or with a needle bed by which piercing area the at least one seizing unit penetrates into the particular at least one article identified as being in a non-upright position in order to receive the at least one article identified as being in a non-upright position, and subsequently the seizing unit discharges from the article stream the particular at least one article identified as being in a non-upright position, into which article it has penetrated.

It is furthermore conceivable that the at least one seizing unit is held swivelably movable by a ball joint temporally with the discharge from the article stream of the at least one received article identified as being in a non-upright position. If the articles of the article stream are moved by back pressure, the particular at least one article identified as being in a non-upright position can, with the help of the ball joint, independently move in an orientation where an abutment on adjacent upright articles by force application is reduced.

It is moreover conceivable that the particular at least one article identified as being in a non-upright position is pushed in an upward direction in the context of the correction step by compressed air and is in the process removed from the article stream. For this purpose, at least one nozzle positioned in the area of a transport level formed for the article stream can be provided, by which at least one nozzle compressed air can in the context of the correction step be applied to the particular at least one article identified as being in a non-upright position.

It is further possible that at least one opening formed along a transport path for the article stream is cleared in the context of the correction step for the at least one article identified as being in a non-upright position, through which opening the particular at least one article identified as being in a non-upright position falls and is hereby removed from the article stream. A container can be disposed below the opening so that the particular at least one article identified as being in a non-upright position is removed from the article stream by falling into the container when the opening is cleared.

The invention moreover relates to an apparatus used to transport articles and to handle irregularly conveyed and/or irregularly aligned and/or non-upright articles of an article stream (7), in particular, under prevention of disturbances in the article stream. Features that have already been described above regarding various embodiments of the method can likewise be provided for various embodiments of the apparatus described below and are therefore not repeatedly mentioned. In addition, features, which will be described below regarding various embodiments of the apparatus, can likewise be used for the previously described method, where applicable.

The apparatus comprises at least one horizontal conveying device, over which a plurality of articles is movable as article stream. The term "horizontal conveying device" selected here is to be understood in the context of the present invention in a comprehensive manner and is intended to likewise include embodiments, for example, in which the horizontal conveying device has a transport panel, over which the article stream is moved in a sliding manner by back pressure. The horizontal conveying device can also have at least one transport belt that is guided circulatingly as well as horizontally, over which at least one circulatingly as well as horizontally guided transport belt the article stream is moved in horizontal direction. It is obvious that there are further possibilities to move an article stream in horizontal direction, so that the invention is not limited to such embodiments.

The apparatus furthermore comprises at least one detection device used to identify at least one irregularly conveyed and/or irregularly aligned and/or non-upright article in the article stream as an error, as well as comprising a handling device that is in operative connection with the at least one detection device in order to resolve the error by uprighting or extracting from the article stream the particular at least one article identified as being irregularly conveyed and/or irregularly aligned and/or in a non-upright position. The handling device can be designed as industrial robot or can comprise an industrial robot. Embodiments have proved successful in which the handling device is designed, for example, as multi-axis robot or as parallel kinematic robot, or in which the handling device comprises a multi-axis robot or a parallel kinematic robot.

The apparatus moreover comprises at least one preparation, which at least one preparation is designed for the defined action upon the at least one article identified as being in a non-upright position and/or upon at least one further, upright article of the article stream in order to prevent a disturbance associated with the error being resolved by the handling device. Numerous possibilities exist in the context of the invention to design the preparation. Preferred embodiments will be referred to below.

In various embodiments, it is possible that the at least one horizontal conveying device forms a first conveyor section for the article stream as well as forming a second conveyor section, which follows upon the first conveyor section in a flow direction of the article stream, and a third conveyor section, which follows upon the second conveyor section in flow direction of the article stream. A detection range of the at least one detection device used to identify the particular at least one non-upright article in the article stream as an error extends at least in sections across the first conveyor section. Furthermore, the second conveyor section is designed to deflect the article stream. The handling device can moreover be assigned to the third conveyor section in order to resolve the error.

It is furthermore possible that the apparatus comprises a plurality of horizontal conveying devices immediately following upon one another and/or adjacent to each other, with the plurality of horizontal conveying devices immediately following upon one another and/or adjacent to each other being controllable in a manner coordinated with one another in order to undo or reduce an abutment by force application preferably caused by back pressure and formed between the at least one non-upright article and at least one immediately adjacent upright article. The plurality of horizontal conveying devices immediately following upon one another and/or adjacent to each other can each be formed by a circulating transport belt.

It is also conceivable that the at least one horizontal conveying device, which is potentially formed by at least one circulating transport belt, and the handling device are controllable in a manner coordinated with one another such that the at least one horizontal conveying device transporting the article identified as being in a non-upright position is powerable at reduced conveying speed or can be stopped temporally with resolving the error.

It is possible that the preparation is designed to apply a defined rotary movement in relation to further, upright articles in the article stream onto the particular article identified as being in a non-upright position, which defined rotary movement is aimed at resolving the error by the handling device. In particular, it is possible that the preparation is designed to apply a defined rotary movement in relation to further, upright articles in the article stream about a horizontally oriented axis onto the particular article identified as being in a non-upright position, which defined rotary movement is aimed at resolving the error by the handling device. Hereby it is possible that an abutment by force application potentially formed between the at least one article identified as being in a non-upright position and at least one further, immediately adjacent, upright article, is at least reduced in terms of amount. The rotary movement can be specified by a control unit and/or regulating unit designed as component of the apparatus, with the control unit and/or regulating unit having an intelligent logic that takes into account the particular abutment by force application in order to determine the particular rotary movement.

It is furthermore conceivable that the preparation is designed to temporarily incline at least one upright article, which is immediately adjacent in the article stream to the at least one article identified as being in a non-upright position. For this purpose, the preparation can have a molded part with a convexly curved outer cover surface, which molded part can be temporarily introduced coming from below into a transport level of the article stream in the area of the particular article identified as being in a non-upright position.

The apparatus or the preparation of the apparatus can also comprise at least one separator element, which, in a direction coming from above, can be dipped into the article stream in the area of the particular at least one article identified as being in a non-upright position, and which is designed to accelerate or decelerate the particular at least one article identified as being in a non-upright position in relation to at least one further, upright article of the article stream. A longitudinal extension of the at least one separator element can in this context be oriented diagonally to a movement direction of the article stream or of the particular at least one article identified as being in a non-upright position. Furthermore, the separator element can be designed or guided in such a manner that the separator element can by the acceleration or deceleration form a first lot with a multitude of articles and a second lot with a multitude of further articles from the article stream, which lots are moved in a manner completely spaced apart from one another after the acceleration or deceleration.

The preparation can be designed to apply a vibration movement to the particular at least one article identified as being in a non-upright position and/or to at least one further upright article of the article stream. As already mentioned above, the at least one horizontal conveying device can have a transport panel along which the article stream is or the articles of the article stream are moved in a sliding manner by back pressure. For various embodiments, it can be provided that the transport panel is movable in a vibrating manner such that a vibration movement is applied to the at least one article identified as being in a non-upright position and/or to the at least one further upright article of the article stream.

The preparation can also be designed to mechanically disintegrate, in particular, by a cutting impact, the particular at least one article identified as being in a non-upright position. The preparation can thus have at least one cutting instrument and/or separating instrument, by which the particular at least one article identified as being in a non-upright position can be disintegrated or disintegrated into a plurality of parts.

The preparation can furthermore be designed in such a manner that the preparation can discharge a content of the particular at least one article identified as being in a non-upright position, which content is in particular formed as a liquid, from the particular at least one article identified as being in a non-upright position. A suction instrument can be provided for this purpose, which is formed, for example, by at least one needle with at least one opening, and by which the content of the particular at least one article identified as being in a non-upright position, which content is in particular formed as a liquid, can be discharged from the particular at least one article identified as being in a non-upright position.

The preparation can have at least one support element, which in the context of the defined action can be positioned on at least on one upright article and on the at least one article preferably immediately adjacent to the article identified as being in a non-upright position, and, positioned there, can support the particular at least one upright article while the error is being resolved. As already mentioned above, it is conceivable in this context that the at least one support element comprises a support plate that is positioned on a plurality of upright articles of the article stream. It is also possible that a plurality of support elements are provided, with one own or exactly one own upright article being assigned to each of the plurality of support elements, on which own upright article the particular support element is positioned, and which own upright article the particular support element can support or which it holds in an upright orientation while the error is being resolved.

In order to remove the error, the preparation in particularly preferred embodiments can have at least one seizing unit by which the particular at least one article identified as being in a non-upright position can be extracted from the article stream or transferred to an upright orientation by a lifting movement caused by the at least one seizing unit. The seizing unit can be fixedly located at a handling device designed, in particular, as industrial robot or parallel kinematic robot, or it can be designed as a component of a handling device designed, in particular, as industrial robot or parallel kinematic robot.

The seizing unit can have at least one contact area, which, in the context of a resolving of the error, is prepared or provided to support a particular upright article immediately preceding in movement direction of the article stream the at least one article identified as being in a non-upright position, and/or a particular upright article immediately succeeding in movement direction of the article stream the at least one article identified as being in a non-upright position.

The at least one seizing unit can also be designed to clasp in a form-fitting manner the particular at least one article identified as being in a non-upright position. For this purpose, the seizing unit can have two shanks located opposite each other, with each of the two shanks located opposite each other having a counter support facing toward the particular at least one article identified as being in a non-upright position, which particular counter support is prepared to abut on a cover surface of the particular article identified as being in a non-upright position.

It is conceivable that the at least one seizing unit has an air cushion, which, in the context of a resolving of the error, can be brought into abutment by force application on the particular at least one article identified as being in a non-upright position. For this purpose, the apparatus can have a compressed air generating device that can apply compressed air to the air cushion to receive the particular article identified as being in a non-upright position. The compressed air generating device can be in communication with a control unit and/or regulating unit that can control the compressed air generating device for the particular application of compressed air to the air cushion.

In particular, the at least one seizing unit can have at least two shanks located opposite each other or two clamping elements and/or gripping elements located opposite each other which can be dipped into the article stream in the area of the particular at least one article identified as being in a non-upright position, and of which the relative distance from each other can be increased as well as decreased in order to receive in a form-fitting and/or force-locking manner the particular at least one article identified as being in a non-upright position.

The apparatus can comprise a gantry system. The at least one seizing unit can be disposed in a suspended manner from the gantry system. The at least one seizing unit can furthermore be movable along the gantry system in order to upright and/or to remove the particular at least one article identified as being in a non-upright position. The gantry system can be designed to move the at least one seizing unit along a plurality of different horizontal spatial directions.

The apparatus can also comprise a parallel kinematic robot, by which the at least one seizing unit is movable in order to upright and/or to extract the particular at least one article identified as being in a non-upright position. The parallel kinematic robot can be designed as a tripod.

It is furthermore conceivable that the apparatus comprises a rope system, with which the at least one seizing unit is in communication, and by which the at least one seizing unit is movable in order to upright and/or to extract the particular at least one article identified as being in a non-upright position.

The apparatus can also comprise an unmanned aircraft, by which the at least one seizing unit is movable in order to upright and/or to extract the particular at least one article identified as being in a non-upright position. The at least one seizing unit can be coupled in a suspended manner to the unmanned aircraft. In this context it is also conceivable that the apparatus comprises a container. The unmanned aircraft can then be controllable by a control unit and/or regulating unit in order to discharge the particular at least one article identified as being in a non-upright position from the article stream as well as to position the particular article identified as being in a non-upright position and having been discharged from the article stream in the container. It is also conceivable that, by the control unit and/or regulating unit, the unmanned aircraft is designed to discharge the particular at least one article identified as being in a non-upright position from the article stream as well as to subsequently hereafter deposit the article identified as being in a non-upright position and having been discharged from the article stream in a determined position. In preferred embodiments, a connection between the control unit and/or regulating unit and the unmanned aircraft, which connection is designed to control the unmanned aircraft, can be designed in a wireless manner.

The at least one seizing unit can furthermore be designed in such a manner that the at least one seizing unit can penetrate into the particular at least one article identified as being in a non-upright position and can discharge from the article stream the particular at least one article identified as being in a non-upright position, into which it has penetrated.

The apparatus can also comprise a ball joint, by which the at least one seizing unit is held in a freely swivelably movable manner. The at least one seizing unit can have a base, at which the ball joint is at least partly fixedly located. Furthermore, the base can have two shanks located opposite each other, by which two shanks located opposite each other the at least one article identified as being in a non-upright position can be received in a form-fitting and/or force-locking manner or can be gripped in a form-fitting and/or force-locking manner.

It is possible that the apparatus comprises at least one nozzle positioned below and/or at an article stream transport level formed by the at least one horizontal conveying device, by which at least one nozzle positioned below and/or at an article stream transport level formed by the at least one horizontal conveying device an air blast can be applied to the particular at least one article identified as being in a non-upright position in order to extract the article from the article stream. By the air blast, the at least one article identified as being in a non-upright position can be discharged from the article stream in an upward direction.

The apparatus can comprise at least one opening disposed along a transport path defined for the article stream by the at least one horizontal conveying device, which opening can be selectively opened or uncovered and covered or closed by a closure. In this context it can be provided that the closure is controllable in order to discharge the particular at least one article identified as being in a non-upright position in such a manner that the closure clears the opening if required and the particular at least one article identified as being in a non-upright position is removed from the article stream by falling into the opening.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIGS. 2 to 9 show individual aspects such as can be provided in each instance to prevent disturbances in various embodiments of the apparatus according to the invention as well as in various embodiments of the method according to the invention;

FIGS. 10 to 18 show seizing units such as can be provided in various embodiments of the apparatus according to the invention as well as in various embodiments to implement the method according to the invention;

FIG. 20 shows an exemplary embodiment of a seizing unit such as can be provided in each instance to prevent disturbances in various embodiments of the apparatus according to the invention as well as in various embodiments of the method according to the invention.

Figure 1:
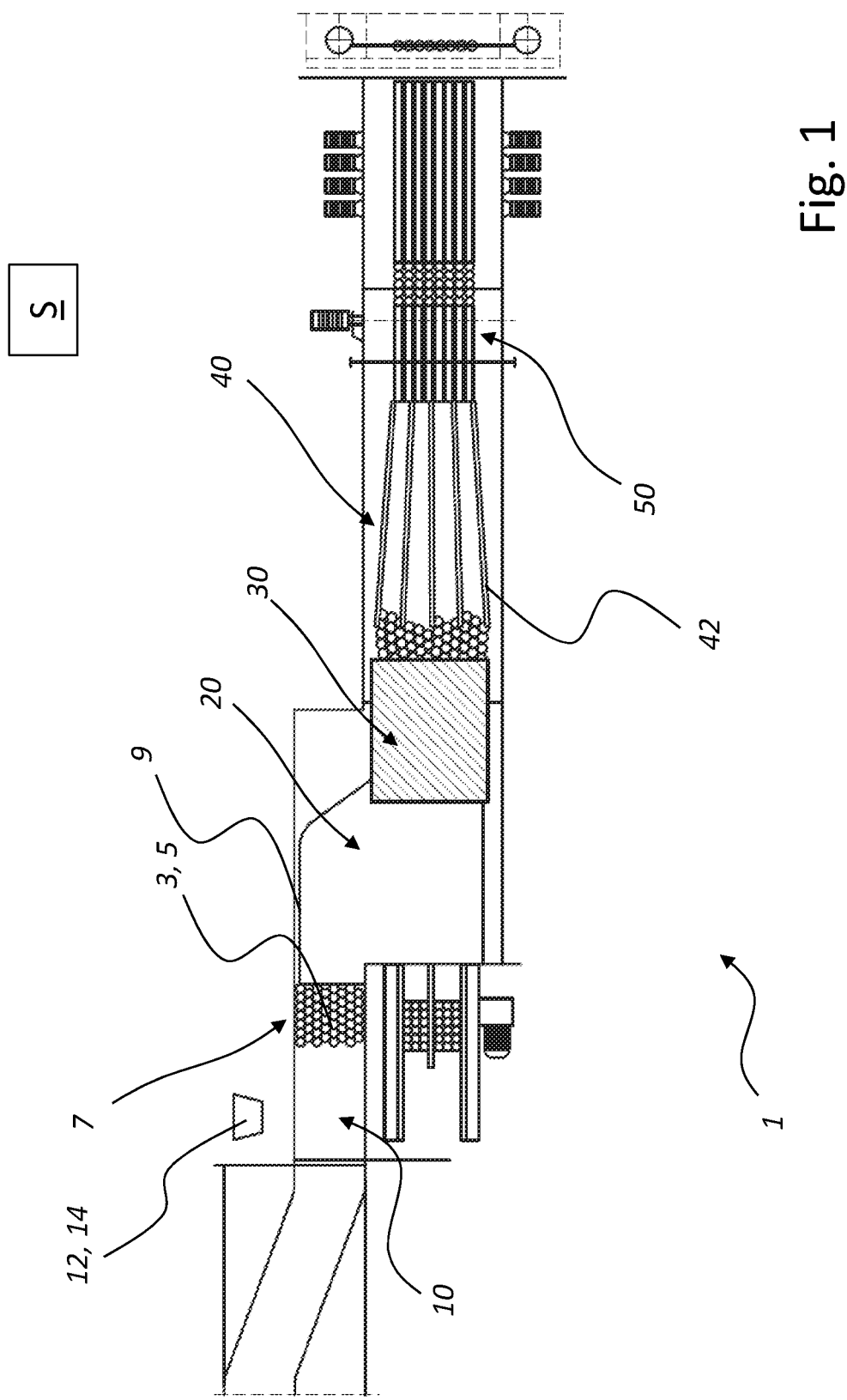
FIG. 1 shows a schematic view of an embodiment of an apparatus according to the invention and illustrates individual steps such as can be provided in an embodiment of a method according to the invention.

The same or equivalent elements of the invention are designated using identical reference characters. Furthermore and for the sake of clarity, only the reference characters relevant for describing the individual figures are provided. It should be understood that the detailed description and specific examples, while indicating preferred embodiments, are intended for purposes of illustration only and are not intended to limit the scope of the invention. It is moreover pointed out that all features described in each instance for the FIGS. 1 to 19 are not to be understood in close context with the particular exemplary embodiment, but can rather each be individually used in a general context. It is also possible that a plurality of seizing units according to one of the FIGS. 10 to 18 or according to a plurality of several FIGS. 10 to 18 can be provided or used for the apparatus according to FIG. 1 or for an apparatus according to the invention in a general context as well as for the method according to FIG. 19 or for the method according to the invention in a general context. It is moreover possible that a plurality of preparations or defined actions according to one of the FIGS. 2 to 9 or according to a plurality of several FIGS. 2 to 9 can be provided for the apparatus according to FIG. 1 or for an apparatus according to the invention in a general context as well as for the method according to FIG. 19 or for the method according to the invention in a general context.

The embodiments, examples and alternatives of the preceding paragraphs, the claims, and the following figures and description, including any of their various aspects or respective individual features, may thus be taken independently or in any combination. Features described in connection with one embodiment are applicable to all embodiments, unless such features are incompatible.

If illustrations and aspects are generally referred to as being "schematic" in the context of the figures, this is by no means intended to imply that the illustration of the figures and their description are of inferior significance with regard to the disclosure of the invention. The person skilled in the art is fully capable of gathering sufficient information from the schematically and abstractly drawn illustrations for facilitating the understanding of the invention without the understanding being in any way impaired by, for example, the size ratios of the piece goods and/or of parts of the apparatus or of other of the drawn elements being drawn and being potentially not precisely true to scale. On the basis of the more concretely explained realizations of the method according to the invention and on the basis of the more concretely explained functionality of the apparatus according to the invention in the figures, the person skilled in the art as a reader is thus enabled to derive a better understanding of the inventive idea, which is formulated in a more general and/or more abstract manner in the claims and in the general part of the description.

DETAILED DESCRIPTION OF THE INVENTION

Figure 19:
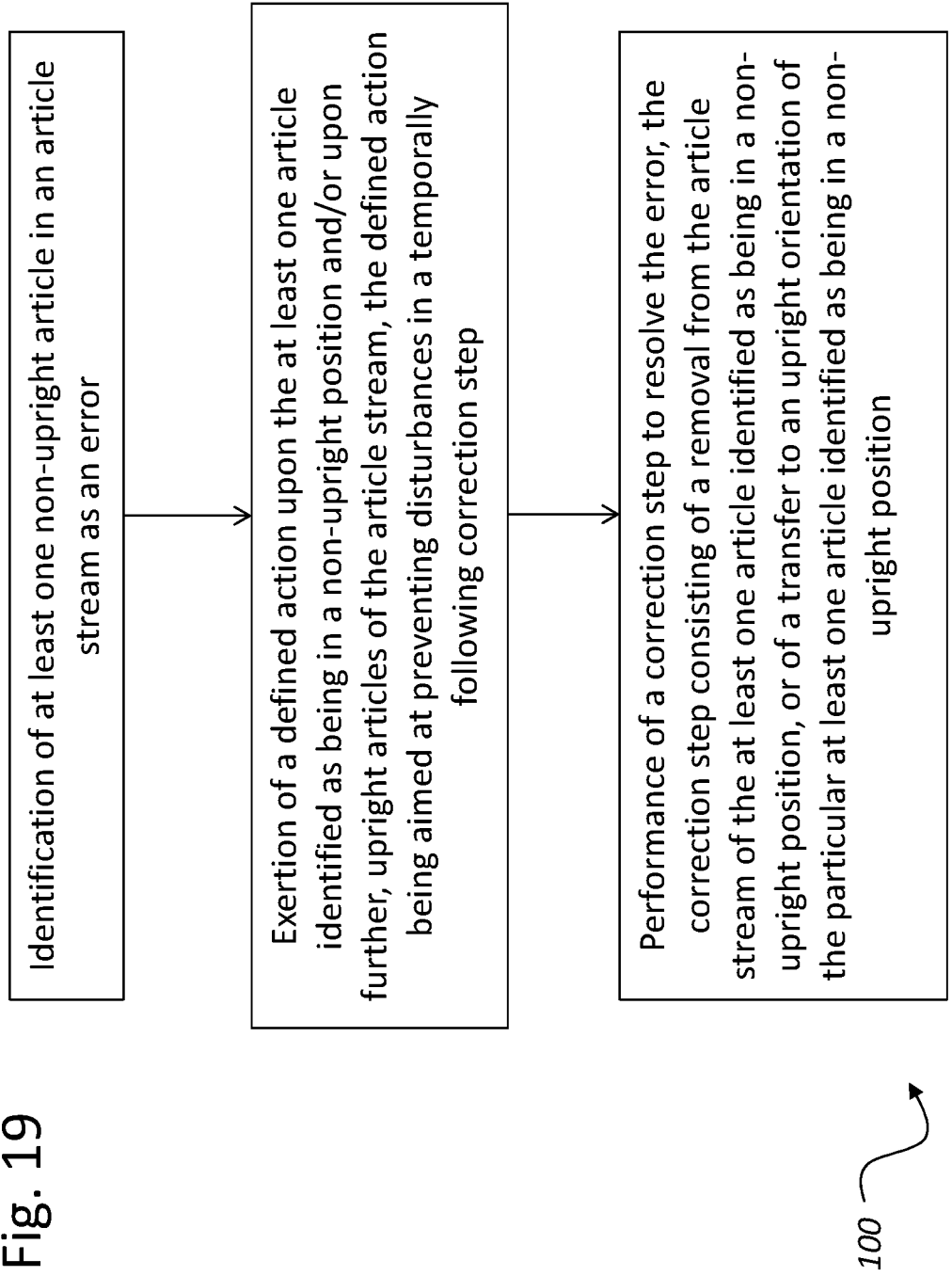
FIG. 19 shows a flowchart of individual steps such as can be provided in an embodiment of the method according to the invention.

The FIG. 1 shows a schematic view of an embodiment of an apparatus 1 according to the invention and illustrates individual steps such as can be provided in an embodiment of a method 100 according to the invention (cf. FIG. 19).

The apparatus 1 is provided to transport articles 3, which are formed by beverage containers 5 or PET bottles in the exemplary embodiment of FIG. 1. The apparatus 1 forms a first conveyor section 10 for an article stream 7 or for a stream of individual articles 3 or beverage containers 5.

The individual articles 3 or beverage containers 5 are moved in a disorderly mass flow over the first conveyor section 10. For this purpose, a horizontal conveying device, which is not illustrated in FIG. 1, can be provided in the first conveyor section 10, on which horizontal conveying device the articles 3 or beverage containers 5 are standing and on which they are moved over the first conveyor section 10. It is also conceivable that the articles 3 or beverage containers 5 are moved by back pressure over the first conveyor section 10.

Following immediately upon the first conveyor section 10 is a second conveyor section 20, in which the article stream 7 or individual articles 3 of the article stream 7 come into contact with a curve 9 and are hereby deflected toward a third conveyor section 30 immediately following upon the second conveyor section 20. It is possible that the articles 3 or beverage containers 5 are moved by back pressure over the first conveyor section 10, the second conveyor section 20, and/or the third conveyor section.

Upon the individual articles 3 of the article stream 7 reaching the third conveyor section 30, the individual articles 3 of the article stream 7 are moved essentially in a straight line or linearly in the third conveyor section 30. The article stream 7 or the stream of individual articles 3 continues to take the form of a disorderly mass flow in the third conveyor section 30. Following upon the third conveyor section 30, there is a fourth conveyor section 40, in which individual rows of moving articles 3 are formed from the article stream 7. For this purpose, the fourth conveyor section 40 comprises a plurality of guide rails 42, of which the relative distance from each other in each instance decreases in a movement direction of the articles 3 in order to form the individual rows of moving articles. In a fifth conveyor section 50, the individual rows of articles 3 formed in the fourth conveyor section 40 are moved between lane separators that are oriented parallel to each other. Successive articles 3 of the individual rows are hereafter spaced apart relative to each other, whereupon groupings are formed from a plurality of individual articles, the groupings being gathered together in each instance to a particular bundle by corresponding outer packages. A grouping station provided for this purpose as well as a device for applying a particular outer packaging onto a particular grouping are not illustrated in FIG. 1, can in various embodiments, however, be formed as a component of an apparatus 1.

The transport or the movement of the article stream 7 or of the articles 3 over the individual conveyor sections 10, 20, 30, 40, and 50, is carried out by at least one horizontal conveying device 7 (cf., for example, FIG. 4), which is not illustrated in FIG. 1 of the present patent application, and which can be designed as a transport belt, for example. For the sake of completeness, it should be noted once more that there is the possibility in various embodiments for the articles 3 or the article stream 7 to be moved by back pressure over the first conveyor section 10, the second conveyor section 20, the third conveyor section 30, and/or the fourth conveyor section 40.

The FIG. 1 furthermore shows a detection device 12, which is in communication with a control unit and/or regulating unit S such that the control unit and/or regulating unit S can, with the help of the detection device 12, identify a particular non-upright or a tilted article 4 (cf. FIG. 2) in the article stream 7 as an error. The detection device 12 is designed as camera system 14. A detection range of the detection device 12 designed as camera system 14 extends across the first conveyor section 10 of the apparatus 1 such that the control unit and/or regulating unit S can identify a particular non-upright article 4 during its movement over the first conveyor section 10 as an error in the article stream 7.

As mentioned above, number 30 indicates a third conveyor section, which the article stream 7 enters after a deflection carried out in the second conveyor section 20 and caused by the curve 9. The apparatus 1 moreover has a handling device, which is not illustrated in the FIG. 1 along with the present patent application, which can be designed, for example, as a multi-axis robot or a parallel kinematic robot, and which carries at least one seizing unit 25 according to one of the FIGS. 10 to 18 or according to a plurality of the FIGS. 10 to 18.

The control unit and/or regulating unit S is in communication with the handling device and can control the handling device upon having identified a non-upright article 4 in the range of the first conveyor section 10 as an error, with the handling device moving the particular at least one seizing unit 25 in the range of the third conveyor section 30 toward the particular article 4 identified as being in a non-upright position and removing the particular article 4 identified as being in a non-upright position from the article stream 7 or transferring it to an upright orientation. The seizing unit 25 can thus remove the particular non-upright article 4 located in the third conveyor section 30 from the article stream or transfer it to an upright orientation, with the identification of the non-upright article 4 as an error in the article stream 7 being carried out in the range of the first conveyor section 10.

Moreover, at least one preparation 6 as described in the exemplary embodiments of the following FIGS. 2 to 9 is a component of the apparatus 1. The at least one preparation 6 can in this context counteract disturbances during a particular extraction of a particular at least one article 4 identified as being in a non-upright position. It is possible that the at least one preparation 6, for example, supports individual upright articles 3 of the article stream 7 temporally during the extraction of the particular at least one article 4 identified as being in a non-upright position and hereby prevents an inadvertent tilting of these upright articles 3 of the article stream 7.

It is also possible that the individual articles 3 of the article stream 7 abut on each other by back pressure. If there is a non-upright article 4 in the article stream 7, it is possible that the non-upright article 4 is held due to back pressure in a clamping manner between further, immediately adjacent, upright articles 3 of the article stream 7. The preparation 6 can therefore be designed in such a manner that such a clamping is removed by the preparation 6 by the back pressure acting upon the article 4 identified as being in a non-upright position being undone or reduced. Various embodiments by which the back pressure can be reduced or undone will be described in the following figures.

Figure 2:
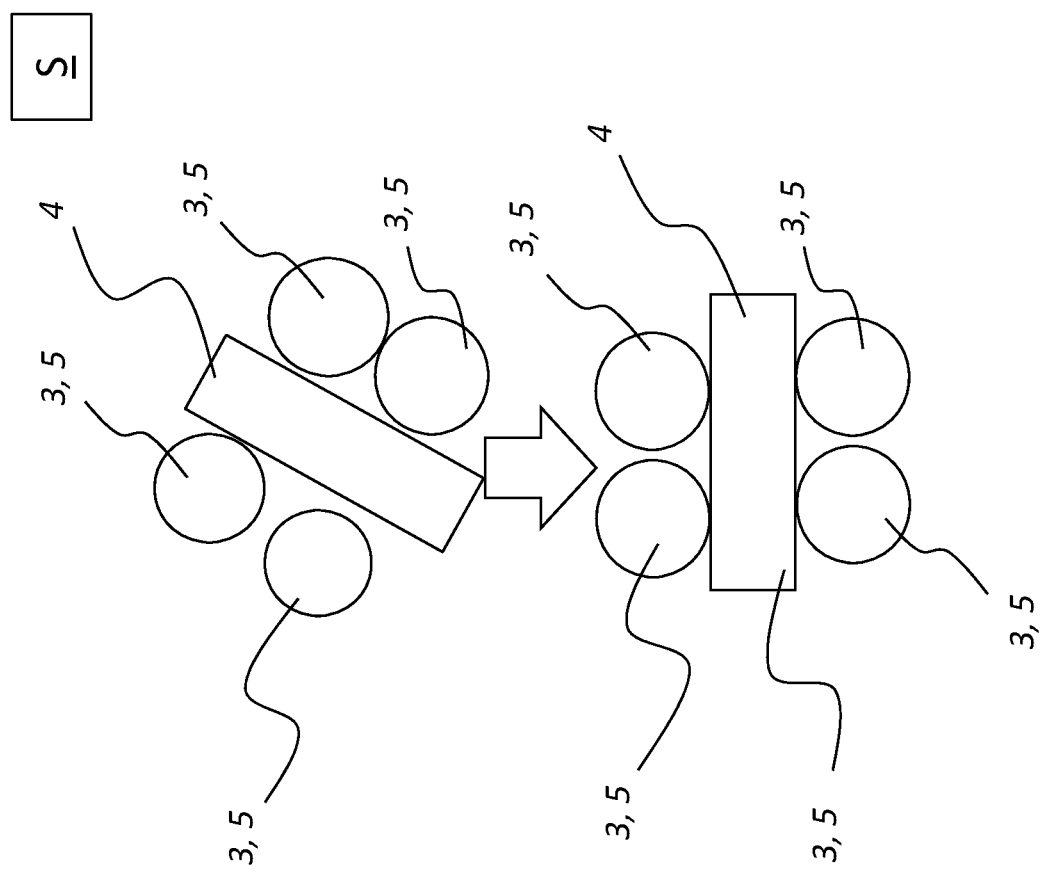

The schematic top view of FIG. 2 shows a defined action upon a particular article 4 identified as being in a non-upright position, which action is aimed at preventing disturbances during an uprighting temporally following the defined action or during a removal from the article stream 7 of the article 4 identified as being in a non-upright position, the removal temporally following the defined action.

The article 4 identified as being in a non-upright position is illustrated in a first rotational orientation at the top in FIG. 2. A further rotational orientation for the article 4 identified as being in a non-upright position is indicated by an arrow-based illustration in FIG. 2, to which further rotational orientation the article 4 identified as being in a non-upright position can be transferred from the topmost illustrated first rotational orientation.

It has already been mentioned with regard to FIG. 1 showing the apparatus 1 that the control unit and/or regulating unit S can identify a particular non-upright article 4 in the article stream 7 in the range of the first conveyor section 10 as an error by the detection device 12 or the camera system 14. In this context it is possible that the control unit and/or regulating unit S moreover determines a particular angular position of the particular article 4 identified as being in a non-upright position in the article stream 7 by the detection device 12 or the camera system 14. Since the article 4 identified as being in a non-upright position abuts by back pressure, potentially by force application, on an immediately adjacent article 3, and since such an abutment by force application can involve disturbances in the removal or in the uprighting of the particular article 4 identified as being in a non-upright position, such embodiments have proved successful in which the back pressure is reduced in terms of amount or is completely undone temporally before the extraction or temporally before the transfer to an upright orientation of the article 4 identified as being in a non-upright position.

An intelligent logic is stored for this purpose on the control unit and/or regulating unit S, which intelligent logic can derive information on a target angular position in consideration of the particular angular position determined by the detection device 12 or the camera system 14 for the article 4 identified as being in a non-upright position, in which target angular position the abutment by force application formed by back pressure in relation to immediately adjacent articles 3 is undone or at least formed in a reduced manner in terms of amount.

Such embodiments have proved successful in which the article stream 7 is moved for this purpose at least in sections over a multitude of horizontal conveying devices, which are adjacent in and/or diagonally to the movement direction of the article stream 7, and which can be potentially formed by transport belts adjacent to each other in movement direction of the article stream 7 and/or diagonally to the movement direction of the article stream 7.

The horizontal conveying devices, which are adjacent in and/or diagonally to the movement direction of the article stream 7, or the transport belts, which are adjacent to each other can be controlled by the control unit and/or regulating unit S in a manner coordinated with one another and potentially at different conveying speeds, such that the particular article 4 identified as being in a non-upright position is transferred from a first, determined angular position to a target angular position, in which target angular position the abutment by force application of the article 4 identified as being in a non-upright position on further, immediately adjacent, upright articles 3 is reduced in terms of amount or is completely undone.

A rotating or a transferring of the particular article 4 identified as being in a non-upright position from an actual angular position to a target angular position according to the description for FIG. 2 can be carried out in the range of the first conveyor section 10, in the range of the second conveyor section 20, and/or in the range of the third conveyor section 30 (cf. FIG. 1). A rotating can be carried out, in particular, temporally before a removal of the particular article 4 identified as being in a non-upright position from the article stream 7 or temporally before a transferring of the article 4 identified as being in a non-upright position to an upright orientation.

In practice, such embodiments have also proved successful for this purpose in which a handling device or a seizing unit 25 being moved by the handling device (cf. FIGS. 10 to 18) dips into the article stream 7 coming from above, seizes the particular article 4 identified as being in a non-upright position, and temporally following hereafter causes a rotary movement for the particular article 4 identified as being in a non-upright position, with the particular article 4 identified as being in a non-upright position being transferred from the particular identified or determined actual angular position to a target angular position.

It can be provided that the handling device leaves the article 4 identified as being in a non-upright position after having transferred the particular article 4 identified as being in a non-upright position to the particular target angular position. Temporally following hereafter, a further handling device or a further seizing unit 25 can at a later point in time again receive the particular article 4 identified as being in a non-upright position and already having been transferred to the target angular position, and then remove it from the article stream 7 or transfer it to an upright orientation. With regard to FIG. 1, it can thus be provided that a handling device or a seizing unit 25 being moved by the handling device transfers a particular article 4 identified as being in a non-upright position in the first conveyor section 10 from a particular identified or determined actual angular position to a target angular position, with the particular article 4 identified as being in a non-upright position assuming a particular target angular position in the first conveyor section 10. This particular article 4 identified as being in a non-upright position and already having been transferred to its particular target angular position in the first conveyor section 10 can then in the third conveyor section 30 be removed from the article stream 7 or transferred to an upright orientation by a further handling device or by a further seizing unit 25.

Alternatively, it can be provided that a handling device or a seizing unit 25 being moved by the handling device, receives a particular article 4 identified as being in a non-upright position, transfers it from a particular identified or determined actual angular position to a target angular position, an then removes or extracts from the article stream 7 or transfers to an upright orientation the particular article 4 identified as being in a non-upright position and having been transferred to the target angular position, without meanwhile leaving this particular article 4 identified as being in a non-upright position.

Figure 3:
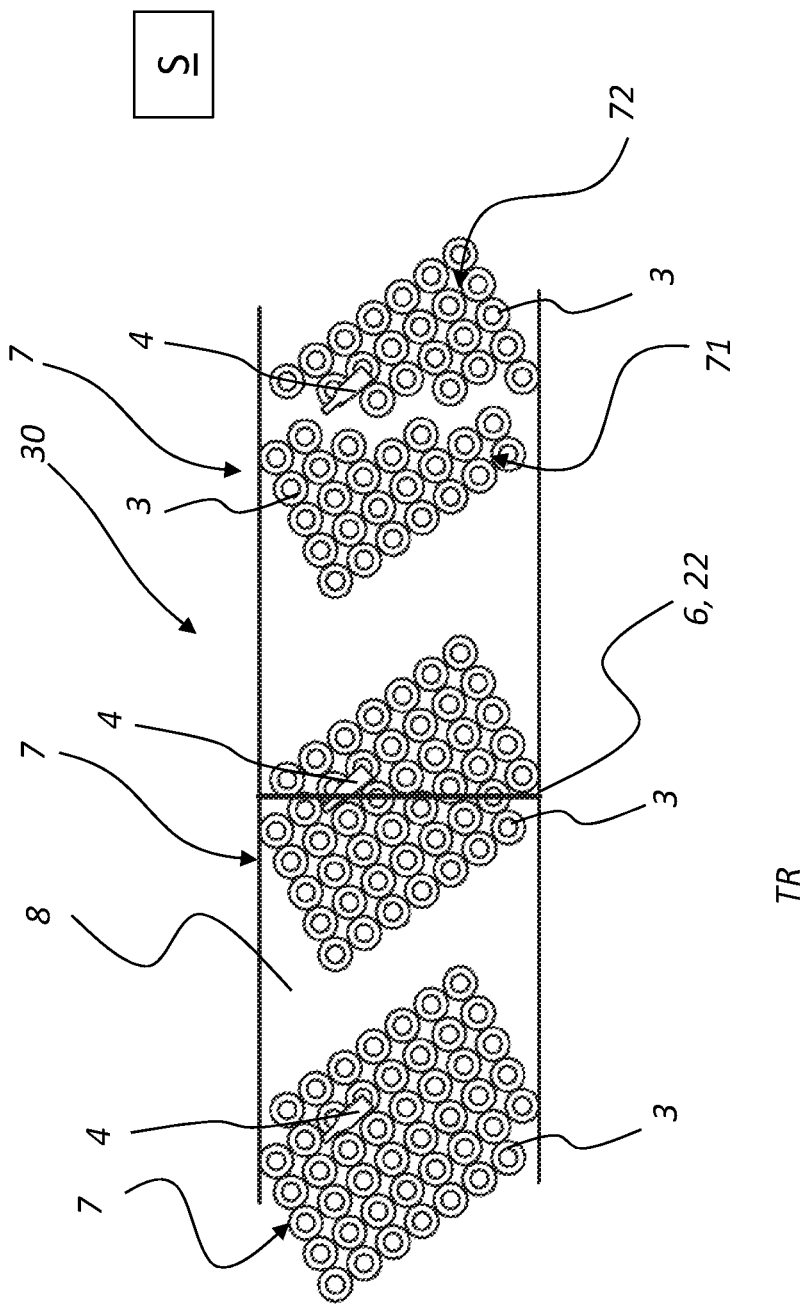

The schematic top view of FIG. 3 shows a further defined action upon a particular non-upright article 4, which further defined action can be carried out additionally or alternatively to the defined action from FIG. 2 for the prevention of disturbances in an uprighting or in a removal from the article stream 7 of the article 4 identified as being in a non-upright position, the uprighting or the removal temporally following the defined action. In this context, FIG. 3 shows the third conveyor section 30 already illustrated in FIG. 1. A corresponding defined action according to FIG. 3 is, however, likewise conceivable for the range of the first conveyor section 10 or for the range of the second conveyor section 20.

The article stream 7 or the individual articles 3 of the article stream 7 are being moved over a horizontal conveying device 8 in transport direction TR. The horizontal conveying device 8 can be designed as circulating transport belt, or it can provide a transport surface for the article stream 7, along which transport surface the article stream 7 is moved in a sliding manner by back pressure.

The non-upright article 4 in the article stream 7 has been identified as an error by a control unit and/or regulating unit S by a detection device 12 or by a camera system 14 (cf. FIG. 1). On the left side in FIG. 3, the article stream 7 is illustrated without a defined action having yet been exerted on the article stream 7 in the left illustration. The individual articles 3 of the article stream 7 are potentially being moved by back pressure such that immediately adjacent and upright articles 3 abut by force application on the article 4 identified as being in a non-upright position. The article 4 identified as being in a non-upright position is hereby held in a clamping manner between the immediately adjacent articles 3 of the article stream 7, whereby a removal of the article 4 identified as being in a non-upright position from the article stream 7 or a transfer of the article 4 identified as being in a non-upright position to an upright orientation is at least made difficult.

Disturbances can occur, in particular, because upright articles 3 that are immediately adjacent to the article 4 identified as being in a non-upright position can potentially inadvertently tilt temporally during a removal or during a transfer of the article 4 identified as being in a non-upright position to an upright orientation. It is furthermore possible that the article 4 identified as being in a non-upright position becomes wedged between immediately adjacent, upright articles 3 of the article stream 7, whereby a removal or a transfer of the article 4 identified as being in a non-upright position to an upright orientation is made difficult or associated with problems.

In order to prevent such problems or such disturbances or further problems, a defined action is exerted upon the article stream 7 in the exemplary embodiment from FIG. 3. For this purpose, a separator element 22 dips into the article stream 7 coming from above in the area of the article 4 identified as being in a non-upright position. A lengthwise orientation of the separator element 22 is in this context oriented diagonally or perpendicular to a movement direction of the article stream 7. The separator element 22 or a position of the separator element 22 upon dipping into the article stream 7, is discernible or exemplarily indicated in FIG. 3 in the central illustration.

Temporally after the separator element 22 dipping into the article stream 7, a first succeeding lot 71 of the article stream 7 is decelerated in relation to a second preceding lot 72 of the article stream 7, or the second preceding lot 72 of the article stream 7 is accelerated in relation to the first succeeding lot 71 of the article stream 7, which involves the first lot 71 to be completely spaced apart from the second lot 72, as shown according to the illustration on the right side of FIG. 3. A continuous clearance is formed between the first lot 71 and the second lot 72. Temporally after spacing the first lot 71 apart from the second lot 72, the particular article 4 identified as being in a non-upright position is furthermore cleared at least in some sections, and is thus at least in some sections accessible for a later extraction or for a later transfer to an upright orientation.

It should be moreover mentioned that the article stream 7 as well as the first and second lots 71 and 72 formed from the article stream 7 can be moved in an uninterrupted or continuous manner starting from the identification or determination of the particular non-upright article 4 in the article stream 7 according to the illustration on the left side, up to the complete separation of the article stream 7 into the first and second lots 71 and 72. The separator element 22 can be guided over a specific path distance or for a specific time period together with the article stream 7 in a movement direction of the article stream 7, with the separator element 22 decelerating the first lot 71 in relation to the second lot 72 or accelerating the second lot 72 in relation to the first lot 71, as described above. After the article stream 7 has been separated into the first lot 71 and the second lot 72 according to the illustration on the right side, the separator element 22 can leave the first lot 71 and the second lot 72 in an upward direction or can be extracted in an upward direction from the first lot 71 and in an upward direction from the second lot 72. The separator element 22 thus forms a preparation 6 or is formed as a component of a preparation 6, by which preparation 6 an abutment by force application of the article 4 identified as being in a non-upright position on at least one further, immediately adjacent article 3 can be undone.

Temporally following the defined action by the preparation 6 according to FIG. 3, the article 4, which was identified as being in a non-upright position and which is meanwhile contained in the second lot 72 formed via the steps according to FIG. 3, can either be transferred to an upright orientation or can be extracted from the article stream 7 or from the second lot 72 formed from the article stream 7.

The schematic perspective view of FIG. 4 seen in conjunction with FIG. 18 illustrates a further defined action upon a particular article 4 identified as being in a non-upright position.

A seizing unit 25 having a U-formed base 27 as shown in FIG. 4 is discernible in each instance in FIG. 4 as well as in the FIGS. 18A and 18B. Two shanks 28 and 28' located opposite each other and leading into the base 27 together form a receptacle 29 that is formed in a manner corresponding to a bottle neck or a container neck. A so-called neck ring of a particular article 4 identified as being in a non-upright position or of a tilted beverage container or a tilted bottle, can be gripped in a form-fitting manner by the receptacle 29. This can be discerned well from FIG. 18A. Following hereafter, a defined action can be exerted via the seizing unit 25 upon article 4 identified as being in a non-upright position and having been gripped, with the defined action being aimed at preventing disturbances during the extraction of the particular article 4 identified as being in a non-upright position or during the uprighting of the particular article 4 identified as being in a non-upright position.

For this purpose, the seizing unit 25 has a ball joint 26 on a top side. By the ball joint 26, the seizing unit 25 is coupled in a freely rotationally movable or swivelably movable manner to a handling device not illustrated here. As already described with FIG. 2, it is possible that a particular article 4 identified as being in a non-upright position is held by back pressure in a clamping manner between immediately adjacent, upright articles 3 of the article stream 7. Since the seizing unit 25 as well as the particular article 4 identified as being in a non-upright position and having been received in a form-fitting manner are fixedly located by the ball joint 26 in a freely rotationally movable or swivelably movable manner at a handling device, the particular article 4 identified as being in a non-upright position can move independently together with the seizing unit 25, temporally during an extraction or during an uprighting by the seizing unit 25, into an angular position, where the clamping abutment on immediately adjacent upright articles 3 is formed in an at least reduced manner in terms of force.

In order to be able to grip or receive in a form-fitting manner the particular bottle neck or the neck ring by the receptacle 29, it is possible that, temporally preceding hereto, a particular article 4 identified as being in a non-upright position is cleared at least in some sections according to the previous description with FIG. 3 by the article stream 7 being separated into a first lot 71 and a second lot 72. FIG. 18B furthermore shows an extraction of the article 4 identified as being in a non-upright position from the article stream 7. For this purpose, the seizing unit 25 is lifted up and the article identified as being in a non-upright position is swiveled about a horizontally oriented axis. Starting from the position according to FIG. 18B, the seizing unit 25 can then be lifted further, with the article 4 identified as being in a non-upright position losing its surface contact with the horizontal conveying device 8 and being discharged from the article stream 7. As indicated in FIGS. 18A and 18B seen in conjunction, it is also possible to continue the swiveling process for the article 4 identified as being in a non-upright position until the article 4 identified as being in a non-upright position reaches an upright orientation. The seizing unit 25 can then clear the uprighted article or leave the uprighted article.

The FIGS. 5A and 5B show a further defined action upon a particular non-upright articles 4, which further defined action can be carried out additionally or alternatively to the defined action to prevent disturbances according to an exemplary embodiment of at least one of the FIGS. 2 to 4.

As is discernible in FIG. 5A, the articles 3 continue to be transported as article stream 7 by the horizontal conveying device 8. Number 4 indicates an article which, as a non-upright article 4 in the article stream 7, forms an error. Since the individual steps according to FIG. 5 can be used in a general context for a removal of individual articles that form an error independently of their orientation and that can therefore also be potentially upright, the non-upright article 4 in the FIG. 5 is not illustrated in a tilted manner.

As already mentioned regarding FIG. 1, the non-upright article 4 is identified as non-upright article 4 in the article stream 7 by a control unit and/or regulating unit with the help of a detection device 12 or a camera system 14. Since further, upright articles 3 immediately adjacent to the article 4 identified as being in a non-upright position potentially abut on the non-upright article 4 under back pressure or by force application an extraction or an uprighting of the non-upright article 4 can involve problems or a disturbance.

In order to prevent such problems or such disturbances, a preparation 6 is also provided in the exemplary embodiment of FIG. 5A and FIG. 5B, with the preparation 6 comprising a molded part 11 or being designed as molded part 11. The molded part 11 can lift up the particular article 4 identified as being in a non-upright position in an upward direction from an article stream 7 transport level formed by the horizontal conveying device 8, in which context the upright article 3 immediately adjacent to the article 4 identified as being in a non-upright position is inclined in the opposite direction to the article 4 identified as being in a non-upright position. For this purpose, the molded part 11 forms a concavely curved outer cover surface facing toward the particular article 4 identified as being in a non-upright position or toward the horizontal conveying device 8.

An abutment by force application and potentially caused by back pressure of the article 4 identified as being in a non-upright position on further, immediately adjacent articles 3 can for this purpose be reduced in terms of amount or can be at least approximately completely undone. It is also discernible in FIG. 5B that the article 4 identified as being in a non-upright position is made accessible at least in a top section by the described inclination such that the article 4 identified as being in a non-upright position can be received without problems from a position according to FIG. 5B by a seizing unit 25 according to an embodiment of FIGS. 9 to 18 or according to a further embodiment that is not illustrated in the figures.

Figure 6:
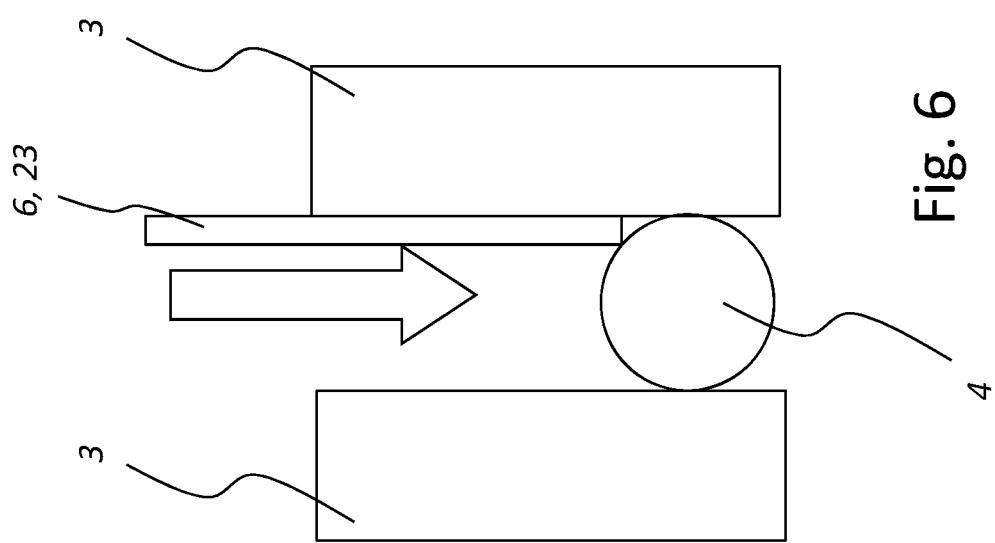

The FIG. 6 shows a further defined action upon a particular article 4 identified as being in a non-upright position, which further defined action can be carried out to prevent disturbances additionally or alternatively to the defined action according to at least one exemplary embodiment of at least one of the FIGS. 2 to 5.

The reference character 4 furthermore indicates the non-upright article 4 in an article stream 7, which non-upright article 4 is identified as error by a control unit and/or regulating unit S with the help of a detection device 12 designed as a camera system 14. The article 4 identified as being in a non-upright position is being moved in an article stream 7 (cf. FIG. 3), with a plurality of upright articles 3 being immediately adjacent to the article 4 identified as being in a non-upright position or immediately preceding or succeeding the article 4 in a movement direction of the article stream 7.

In order to prevent a tilting of the upright articles 3 that are in surface contact with the article 4 identified as being in a non-upright position, a preparation 6 is formed by a support element 23 in the exemplary embodiment of FIG. 6. Exactly one such support element 23 is provided in the exemplary embodiment of FIG. 6. It can be provided for various further exemplary embodiments, however, that a plurality of support elements 23 are provided which interact with each other to prevent a tilting of a plurality of upright articles 3.

In this context it is discernible from FIG. 6 that the support element 23 planarly abuts on an upright article 3. The abutment is formed in the section of a cover surface of the upright article 3, which cover surface faces the article 4 identified as being in a non-upright position. A longitudinal axis of the support element 23 is in this context oriented parallel to a longitudinal axis of the upright article 3 and retains its orientation during a removal from the article stream 7 of the article 4 identified as being in a non-upright position.

In practice, the support element 23 is dipped into the article stream 7 in a direction coming from above in the area of the article 4 identified as being in a non-upright position between the two upright articles 3 illustrated in FIG. 6 and in this process comes into abutment on the just mentioned cover surface of the upright article 3 that immediately precedes the article 4 identified as being in a non-upright position in a transport direction of the article stream 7. The further upright article 3 succeeding in a transport direction of the article stream 7 can also have such a support element 23 assigned to it.

After the support element 23 has come into abutment on the upright article 3 of the article stream 7, the support element 23 is moved along at synchronous speed with the upright article 3 and in this context remains in abutment on the article cover surface. In temporal overlap, the article 4 identified as being in a non-upright position is received by a seizing unit 25 according to an embodiment of the FIGS. 9 to 18 or according to a further embodiment that is not illustrated in the figures, and it is removed or extracted from the article stream 7 or is transferred to an upright orientation. By the abutment of the support element 23 on the cover surface of the upright article 3, which abutment continues to be formed in the process, it can be prevented that the upright article 3 inadvertently tilts during the removal or during the transfer to an upright orientation of the article 4 identified as being in a non-upright position.

Figure 7:
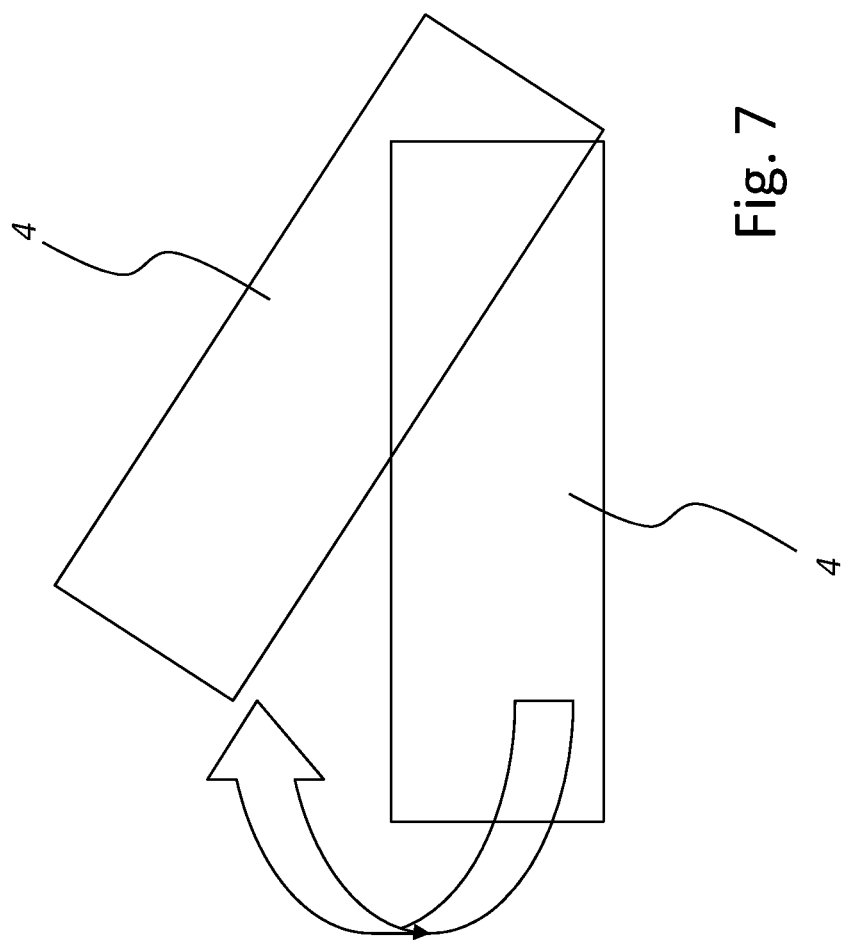

The schematic view of FIG. 7 shows a further defined action upon a particular article 4 identified as being in a non-upright position, which further defined action can be carried out additionally or alternatively to the defined action according to at least one exemplary embodiment of at least one of the FIGS. 2 to 6. The defined action of FIG. 7 is aimed at a prevention of disturbances during an uprighting or extraction from the article stream 7 of the article 4 identified as being in a non-upright position, the uprighting or extraction temporally following the defined action.

In FIG. 7, an article 4 identified as being in a non-upright position is illustrated, which article 4 can be formed as part of an article stream 7 according to the description for FIG. 1 and which can potentially be in abutment by force application on a plurality of further, upright articles 3 that are not illustrated in FIG. 6. The article 4 identified as being in a non-upright position is identified in the article stream 7 as an error according to the previous description for FIG. 1 by a detection device 12 designed as camera system 14.

As already mentioned above, it is possible that an abutment by force application and potentially caused by back pressure of the article 4 identified as being in a non-upright position on further, upright articles 3 involves problems or disturbances in a removal from an article stream 7 of the article 4 identified as being in a non-upright position or in a transfer to an upright orientation of the article 4 identified as being in a non-upright position. In order to prevent such problems, the article 4 identified as being in a non-upright position and illustrated in FIG. 7 is acted upon by a preparation, which is not illustrated here. A handling device can be a component of the non-illustrated preparation, which handling device rotates the article 4 identified as being in a non-upright position about a horizontally oriented swivel axis, and in the process transfers it to an orientation in which an abutment by force application potentially caused by back pressure between the article 4 identified as being in a non-upright position and at least one further, adjacent, upright article 3 (cf. FIG. 5) is formed in a reduced manner in terms of amount or can even be completely undone. Since the particular non-upright article 4 in the article stream 7 is identified by a camera system 14, there is additionally the possibility of determining a relative orientation of the non-upright article 4 in relation to further, upright articles 3 of the article stream 7 with the help of the camera system 14. The camera system 14 can be in communication with the control unit and/or regulating unit S already illustrated in FIG. 1. An intelligent logic can be stored on the control unit and/or regulating unit S, by which intelligent logic a specific angle is specified in consideration of the relative orientation determined by the camera system 14 for the article 4 identified as being in a non-upright position, by which angle the particular article 4 identified as being in a non-upright position can be swiveled about the horizontally oriented axis in order to reduce in terms of amount or in order to completely undo the back pressure formed between the particular article 4 identified as being in a non-upright position and at least one adjacent upright article 3. After specification of the specific angle by the control unit and/or regulating unit S (cf. FIG. 1), the particular non-upright article 4 can be swiveled about the horizontally oriented axis by the handling device formed as component of a preparation. Such a swiveling of the article 4 identified as being in a non-upright position is indicated in FIG. 7 by arrow-based illustration.

Temporally after the particular article 4 identified as being in a non-upright position has been swiveled about the horizontally oriented axis according to FIG. 7, the article 4, having been identified as being in a non-upright position and having been swiveled about the horizontally oriented axis, can be removed from the article stream 7 (cf. FIG. 1) or can be transferred to an upright orientation. Since an abutment by force application potentially formed by back pressure between the article 4 identified as being in a non-upright position and at least one further, adjacent, upright article 3 is reduced in terms of amount or is completely undone by the swiveling about the horizontal axis, the transfer to an upright orientation of the article 4 identified as being in a non-upright position temporally following hereafter or the extraction from the article stream 7 of the article 4 identified as being in a non-upright position temporally following hereafter can be carried out without problems or disturbances.

The schematic view of FIG. 8 shows a further defined action upon a particular article 4 identified as being in a non-upright position, which further defined action can be carried out additionally or alternatively to the defined action according to at least one exemplary embodiment of at least one of the FIGS. 2 to 7. The defined action of FIG. 8 is aimed at a prevention of disturbances during an uprighting or removal from the article stream 7 of the article 4 identified as being in a non-upright position, the uprighting or removal temporally following the defined action.

Furthermore discernible in FIG. 8 is a horizontal conveying device 8 that moves the article stream 7 in transport direction TR. The non-upright article 4 has been identified in the article stream 7 as an error (cf. FIG. 1) by a detection device 12 designed as camera system 14. The article stream 7 is moved by back pressure such that upright articles 3 abut by force application on the article 4 identified as being in a non-upright position. As already mentioned, it is possible that upright articles 3 inadvertently tilt during an extraction of the article 4 identified as being in a non-upright position, whereby disturbances or problems are involved with an extraction of the article 4 identified as being in a non-upright position. Such a tilting or such a disturbance is the more probable the greater in terms of amount the abutment by force application is formed to be between the particular article 4 identified as being in a non-upright position and immediately adjacent upright articles 3.

In order to prevent such problems or such disturbances, the preparation 6 from the exemplary embodiment of FIG. 8 comprises a plurality of support elements 23. Temporally before an extraction of the article 4 identified as being in a non-upright position, a support element 23 is in each instance positioned on a particular, assigned upright article 3, which upright article 3 assigned to the particular support element 23 is immediately adjacent to the article 4 identified as being in a non-upright position.

In order to position the support elements 23 on the particular upright articles 3 of the article stream 7, the support elements 23 are lowered, in each instance in a direction coming from above, and hereby come into contact with a top side of a particular, assigned upright article 3. The article stream 7 with the upright articles 3 and the article 4 identified as being in a non-upright position can continue to be moved without interruption even temporally after a positioning of the support elements 23 on the particular upright articles 3 or after a contact of the support elements 23 with the particular upright articles 3. In order for it to be possible to continue to move the article stream 7 without interruption, the support elements 23 are moved along in transport direction TR at synchronous speed with their particular upright article 3 after their particular positioning thereon or after their particular contact. Temporally during the extraction of the article 4 identified as being in a non-upright position, the support elements 23 remain in contact with their particular upright article 3 such that the support elements 23 hold their particular upright article 3 in an upright orientation temporally during the extraction of the article 4 identified as being in a non-upright position. In this way it can be prevented that the upright articles 3 held by the support elements 23 inadvertently tilt during the extraction of the article 4 identified as being in a non-upright position.

In order for it to be possible to position the support elements 23 accurately on the particular upright article 3, a camera system 14 can be provided, which is potentially in communication with a control unit and/or regulating unit S (cf. FIG. 1). With the help of the camera system 14, the control unit and/or regulating unit S can move the support elements 23 for the purpose of positioning the support elements 23 on their particular upright article 3.

Figure 9:
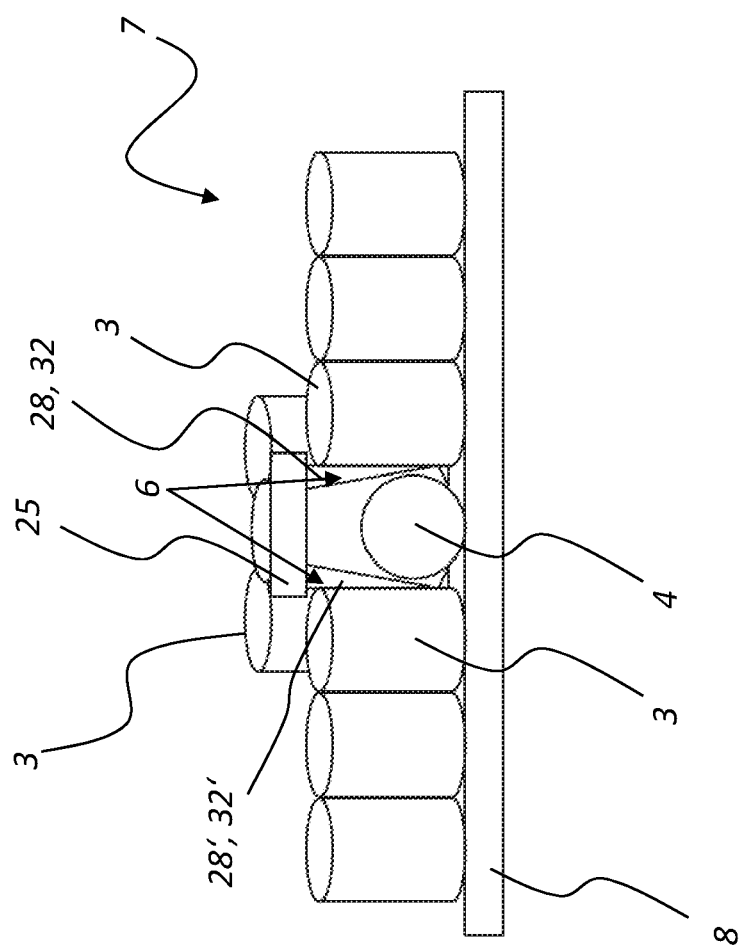

The perspective view of FIG. 9 shows a further defined action upon a particular non-upright article 4, which further defined action can be carried out additionally or alternatively to the defined action according to at least one exemplary embodiment of at least one of the FIGS. 2 to 8. The defined action of FIG. 9 is aimed at a prevention of disturbances during an uprighting or removal from the article stream 7 of the article 4 identified as being in a non-upright position, which uprighting or removal temporally follows the defined action.

Corresponding to the exemplary embodiment of FIG. 8, a horizontal conveying device 8 moving an article stream 7 in transport direction TR is discernible in the exemplary embodiment of FIG. 9. Number 4 furthermore refers to a non-upright article 4 in the article stream 7.

Furthermore provided in FIG. 9 is a seizing unit 25 that has two shanks 28 and 28' located opposite each other, which are formed as a component of a preparation 6. The shanks 28 and 28' are designed as clamping elements and/or gripping elements 32 and 32' and interact together to receive the particular article 4 identified as being in a non-upright position as well as to discharge from the article stream 7 the article 4 identified as being in a non-upright position. As is discernible in FIG. 9, a plurality of articles 3 immediately adjacent to the article 4 identified as being in a non-upright position planarly abut on sides of the clamping elements and/or gripping elements 32, which sides face away from the article 4 identified as being in a non-upright position. The shanks 28 and 28' located opposite each other and designed as clamping elements and/or gripping elements 32 and 32' are formed in such a manner that the shanks 28 and 28' located opposite each other and designed as clamping elements and/or gripping elements 32 and 32' can maintain a planar abutment on upright articles 3 during an extraction of the article 4 identified as being in a non-upright position. These upright articles 3 are supported by the planar abutment such that the supported upright articles 3 of the article stream 7 cannot inadvertently tilt temporally during an extraction of the article 4 identified as being in a non-upright position. In order to dip the seizing unit 25 or the two shanks 28 and 28' of the seizing unit 25, which shanks 28 and 28' are located opposite each other, into the article stream 7 to receive the article 4 identified as being in a non-upright position, it can be provided that the two shanks 28 and 28' located opposite each other can be adjusted relative to each other, with a relative distance of the of the two shanks 28 and 28' located opposite each other first being increased temporally after dipping into the article stream 7, and, following hereafter, being decreased for the purpose of receiving the article 4 identified as being in a non-upright position in a clamping manner. In the context of increasing the relative distance, the upright articles 3 already planarly abutting on the clamping elements and/or gripping elements 32 and 32' can be moved in the opposite direction of the article 4 identified as being in a non-upright position.

Various possibilities by which articles 4 identified as being in a non-upright position can be removed from an article stream 7 or transferred to an upright orientation in the context of conceivable embodiments of the apparatus 1 according to the invention as well as of the method 100 according to the invention are illustrated in the FIGS. 10A, 10B, and 10C.

FIG. 10A, for instance, shows an unmanned aircraft 33. The unmanned aircraft can move a seizing unit 25 attached to the unmanned aircraft 33 toward the particular article 4 identified as being in a non-upright position such that the particular seizing unit 25 can receive the particular article 4 identified as being in a non-upright position. After the process of receiving, the unmanned aircraft 33 can move the seizing unit 25 attached to the unmanned aircraft 33 together with the received article 4 identified as being in a non-upright position in opposite direction to the article stream 7 such that the article 4 identified as being in a non-upright position and having been received is discharged from the article stream 7. The unmanned aircraft 33 is in wireless communication with a control unit and/or regulating unit S (cf. FIG. 1), which specifies a movement of the unmanned aircraft 33 to receive the article 4 identified as being in a non-upright position and to remove the article 4 identified as being in a non-upright position from the article stream 7. In the embodiment of FIG. 10A, the unmanned aircraft 33 has a plurality of rotors disposed in a horizontal plane and acting vertically downward, which rotors can be controlled in a manner coordinated with one another for the defined movement of the unmanned aircraft 33. In preferred embodiments, the unmanned aircraft 33 can have at least four rotors disposed in a horizontal plane and acting vertically downward, which at least four rotors can be controlled in a manner coordinated with one another for the defined movement of the unmanned aircraft 33.

A seizing unit 25 such as can be provided in the context of various embodiments of an apparatus 1 according to the invention or of a method according to the invention, is moreover schematically illustrated in FIG. 10B. The seizing unit of FIG. 10B comprises a lengthwise carrier 37 or a shaft or bar. Attached to an end section of the lengthwise carrier 37 or of the shaft or bar, is a tip 36, which can potentially be designed to be sharp-edged. By the tip 36, the seizing unit can penetrate into a particular article 4 identified as being in a non-upright position and can discharge from the article stream 7 the particular article 4 identified as being in a non-upright position by a movement in opposite direction to the article stream 7 of the lengthwise carrier 37 together with the tip 36 and the particular article 4 identified as being in a non-upright position.

FIG. 10C moreover shows a schematic illustration of a further seizing unit 25 such as can be provided in various embodiments of the apparatus 1 according to the invention or of the method 100 according to the invention. The seizing unit 25 from the exemplary embodiment of FIG. 10C is in communication with a rope system 35 comprising a plurality of individual ropes. By a movement of individual ropes of the rope system 35 in a manner coordinated with one another, the seizing unit 25 illustrated in FIG. 10C can be moved toward a particular article 4 identified as being in a non-upright position in order to receive the particular article 4 identified as being in a non-upright position. By a further coordinated movement of individual ropes of the rope system 35 temporally following hereafter, the seizing unit 25 can then be moved in opposite direction to the article stream 7 together with the article 4 identified as being in a non-upright position and received by the seizing unit 25, and the seizing unit 25 can in this context discharge from the article stream 7 the article 4 identified as being in a non-upright position and having been received.

The FIG. 11 shows a schematic illustration of a further seizing unit 25 such as can be provided in various embodiments of the apparatus 1 according to the invention or of the method 100 according to the invention. The seizing unit 25 from the exemplary embodiment of FIG. 11 has two shanks 28 and 28' located opposite each other, which shanks 28 and 28' can be brought into abutment on opposite sides on a particular article 4 identified as being in a non-upright position and can in this context receive the particular article 4 identified as being in a non-upright position in a clamping manner. Furthermore, the seizing unit 25 has a convexly curved portion 38, which connects the two shanks 28 and 28' located opposite each other to one another. If the particular article 4 identified as being in a non-upright position is a beverage container or a bottle, the convexly curved portion 38 of the seizing unit 25 can be designed in such a manner that the seizing unit 25 can be brought into abutment in a planar manner by the convexly curved portion 38 on the particular article 4 identified as being in a non-upright position and being formed as beverage container or as bottle. The particular article identified as being in a non-upright position can be clasped in an at least partly form-fitting manner by the two shanks 28 and 28' located opposite each other as well as by the convexly curved portion 38 connecting the two shanks 28 and 28' located opposite each other to one another. In this way, an inadvertent disengaging from the seizing unit 25 during the discharge from the article stream 7 of the particular article 4 identified as being in a non-upright position is counteracted.

FIGS. 12A and 12B show a schematic illustration of a further seizing unit 25 such as can be provided in various embodiments of the apparatus 1 according to the invention or of the method 100 according to the invention.

The seizing unit 25 according to FIGS. 12A and 12B comprises a carrier plate 25 with a flange 45, by which flange 45 the seizing unit 25 can be attached to a corresponding counter flange of a handling device. As a result, the handling device, which is in each instance not illustrated in FIGS. 12A and 12B, is capable of moving the seizing unit 25 optionally in the direction or in the opposite direction of a particular article 4 identified as being in a non-upright position.

A gripper 41 is moreover attached to the carrier plate 44. As is discernible in FIGS. 12A and 12B, an article 4 identified as being in a non-upright position can be received by the gripper 41. The seizing unit 25 furthermore comprises a support plate 43, which is mechanically coupled to the carrier plate 45 by a spring mechanism 39 that has a plurality of springs. When the gripper 41 is moved toward the article 4 identified as being in a non-upright position, which article 4 is to be received, the support plate 43 is positioned on a plurality of upright articles 3 in the process. The support plate 43 remains in surface contact with the upright articles 3 and decreases its relative distance to the carrier plate 44 during a further movement of the gripper 41 toward the article 4 identified as being in a non-upright position, with the individual springs of the spring mechanism 39 being preloaded in the process. When the particular article 4 identified as being in a non-upright position has been received by the gripper 41, then the carrier plate 44 of the seizing unit 25 can be moved in opposite direction to the particular upright articles 3 to remove the received article 4 that has been identified as being in a non-upright position. The received article 4 that has been identified as being in a non-upright position is hereby lifted up. While the article 4 identified as being in a non-upright position is being lifted up, the support plate 43 continues to remain in surface contact with the upright articles 3 and holds the upright articles 3 in their upright position by a force supplied by the preloaded springs of the spring mechanism 39. In this way it can be prevented that a disturbance occurs temporally during the extraction or that upright articles 3 inadvertently tilt during an extraction of the article 4 identified as being in a non-upright position. The seizing unit 25 is therefore a component of a preparation 6, by which such disturbances can be counteracted or which is aimed at preventing such disturbances.

Figure 13B:
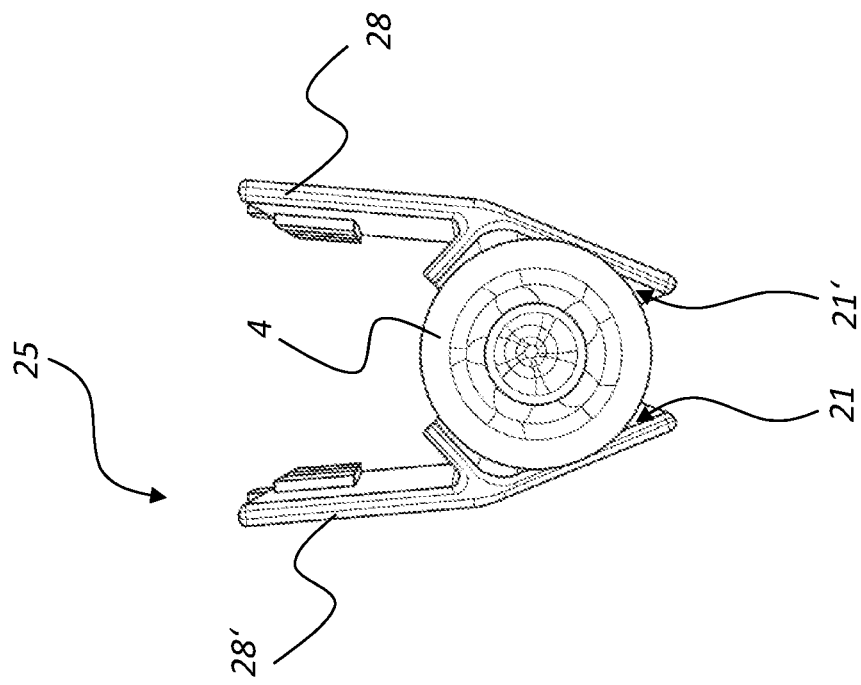
Figure 13A:
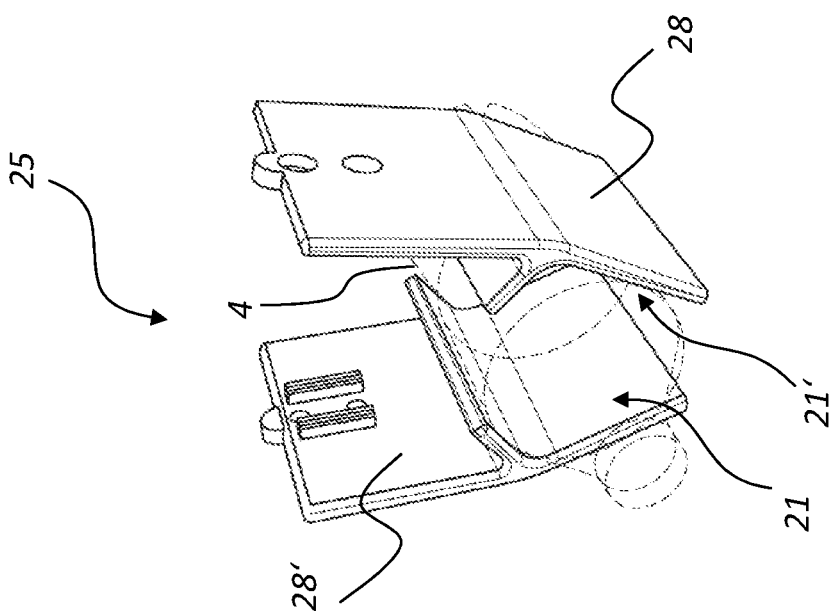

The FIGS. 13A and 13B show a schematic illustration of a further seizing unit 25 such as can be provided in various embodiments of the apparatus 1 according to the invention or of the method 100 according to the invention. The seizing unit 25 comprises two shanks 28 and 28' located opposite each other, which interact with each other in order to receive a particular article 4 identified as being in a non-upright position. As shown in FIGS. 13A and 13B, the particular article 4 identified as being in a non-upright position and formed as beverage container in the present instance is clasped at least in sections in a form-fitting manner by the two shanks 28 and 28' located opposite each other. For this purpose, each of the two shanks 28 and 28' located opposite each other has a particular counter support 21 and 21', which particular counter support 21 or 21' faces toward the particular article 4 identified as being in a non-upright position and having been received and which abuts on a cover surface of the particular article 4 identified as being in a non-upright position and having been received. In this way, the particular article 4 identified as being in a non-upright position can be received in a form-fitting and non-rotating manner by the two shanks 28 and 28' of the seizing unit 25, which shanks 28 and 28' are located opposite each other.

As already described for FIG. 1, a control unit and/or regulating unit S can be provided in various embodiments of the apparatus 1 according to the invention or in order to implement various embodiments of the method 100 according to the invention. The seizing unit 25 according to FIG. 13 can be in operative connection with the control unit and/or regulating unit S to receive a particular article 4 identified as being in a non-upright position.

In this context it is in particular possible that the control unit and/or regulating unit S moves the two shanks 28 and 28' located opposite each other—in consideration of a maximum cross-sectional diameter of the article 4 identified as being in a non-upright position known to the control unit and/or regulating unit S or determined by the control unit and/or regulating unit S—relative to each other in such a way that they assume a specific relative tilt position in consideration of the determined or known maximum cross-sectional diameter. Hereby, the seizing unit 25 can be adapted by the control unit and/or regulating unit S to different geometries or to different maximum cross-sectional diameters of articles 4 identified as being in a non-upright position and intended to be extracted without the seizing unit 25 having to be exchanged for this purpose. The relative movement of the two shanks 28 and 28' located opposite each other can be effected pneumatically, hydraulically, or electrically, for example.

Furthermore, at least one force sensor can be provided, which is in communication with the control unit and/or regulating unit S. In this instance, it is conceivable that the control unit and/or regulating unit S can, with the help of the force sensor, determine or at least approximately in real time monitor a particular holding force applied by the two shanks 28 and 28' located opposite each other onto the article 4 identified as being in a non-upright position. With the help of the force sensor, the two shanks 28 and 28' located opposite each other can be moved by the control unit and/or regulating unit S in such a manner that a holding force, which is used to receive the particular article 4 identified as being in a non-upright position in a clamping manner, is limited or remains within a predetermined value or range in terms of amount.

In particular for embodiments of a seizing unit 25 according to FIGS. 13A and 13B it is also conceivable that the seizing unit 25 or the two shanks 28 and 28' of the seizing unit 25, which shanks 28 and 28' are located opposite each other, is or are first lowered toward the particular article 4 identified as being in a non-upright position and in the process dip into the article stream 7 (cf. FIG. 1 or FIG. 2). Temporally before receiving the particular article 4 identified as being in a non-upright position in a form-fitting manner, the two shanks 28 and 28' located opposite each other can increase their relative distance to each other, with the upright articles 3 immediately adjacent to the article 4 identified as being in a non-upright position being moved in opposite direction to the article 4 identified as being in a non-upright position and in this context losing a surface contact formed with the article 4 identified as being in a non-upright position. Following hereafter, the two shanks 28 and 28' located opposite each other can decrease their relative distance to each other, with the two shanks 28 and 28' located opposite each other coming into surface contact with the article 4 identified as being in a non-upright position and in this context receiving the article 4 identified as being in a non-upright position in a clamping and form-fitting manner.

The FIG. 13A moreover shows that an extension of a particular shank 28 or 28' in longitudinal direction of the article 4 identified as being in a non-upright position is formed to be reduced in terms of amount in relation to a longitudinal extension of the article 4 identified as being in a non-upright position. In this way, the seizing unit 25 or the two shanks 28 and 28' located opposite each other can simply dip into an article stream 7 to receive a particular article 4 identified as being in a non-upright position, without in this context inadvertently coming into contact with further, upright articles 3.

Figure 14B:
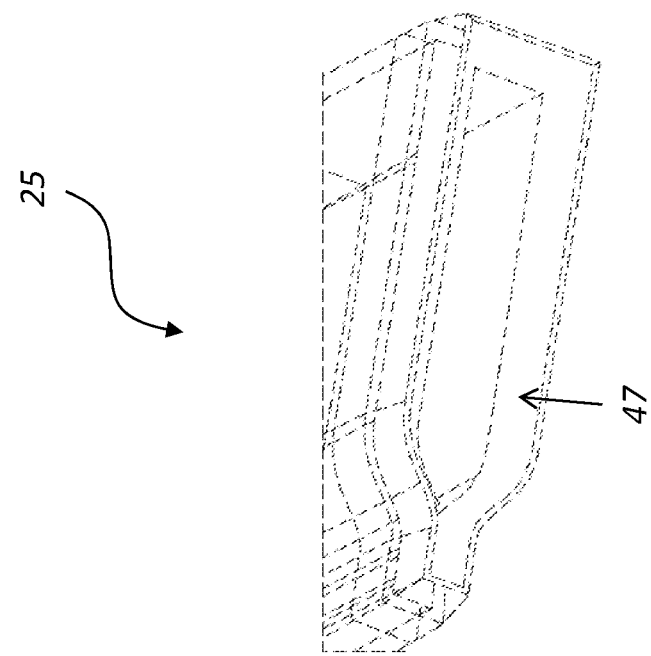
Figure 14A:
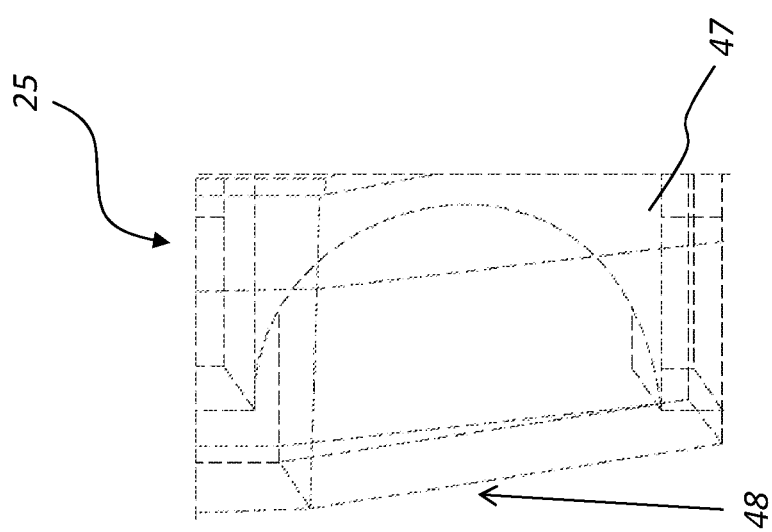

The FIGS. 14A and 14B show a schematic illustration of a further seizing unit 25 such as can be provided in various embodiments of the apparatus 1 according to the invention or of the method 100 according to the invention. Number 47 in FIGS. 14A and 14B in each instance indicates an air cushion formed as part of the seizing unit 25. In order to receive a particular article 4 identified as being in a non-upright position, the seizing unit 25 can be dipped into an article stream 7 and is hereby moved toward the particular article 4 identified as being in a non-upright position or lowered toward the particular article 4 identified as being in a non-upright position. When the seizing unit 25 has reached the particular article 4 identified as being in a non-upright position, the air cushion is filled via compressed air, which involves the particular article 4 identified as being in a non-upright position to be held in a form-fitting manner under abutment on the air cushion 47 filled with compressed air as well as being held in a force-locking manner by the air cushion 47. The air cushion 47 can be fluidically coupled to a compressor in order to be filled with compressed air.

The seizing unit 25 can furthermore be moved together with the article 4 identified as being in a non-upright position and being held by the compressed-air-filled air cushion 47 in opposite direction to an article stream 7, in which context the article 4 identified as being in a non-upright position and being held by the compressed-air-filled air cushion 47 is discharged from the article stream 7 or removed from the article stream 7.

Figure 15:
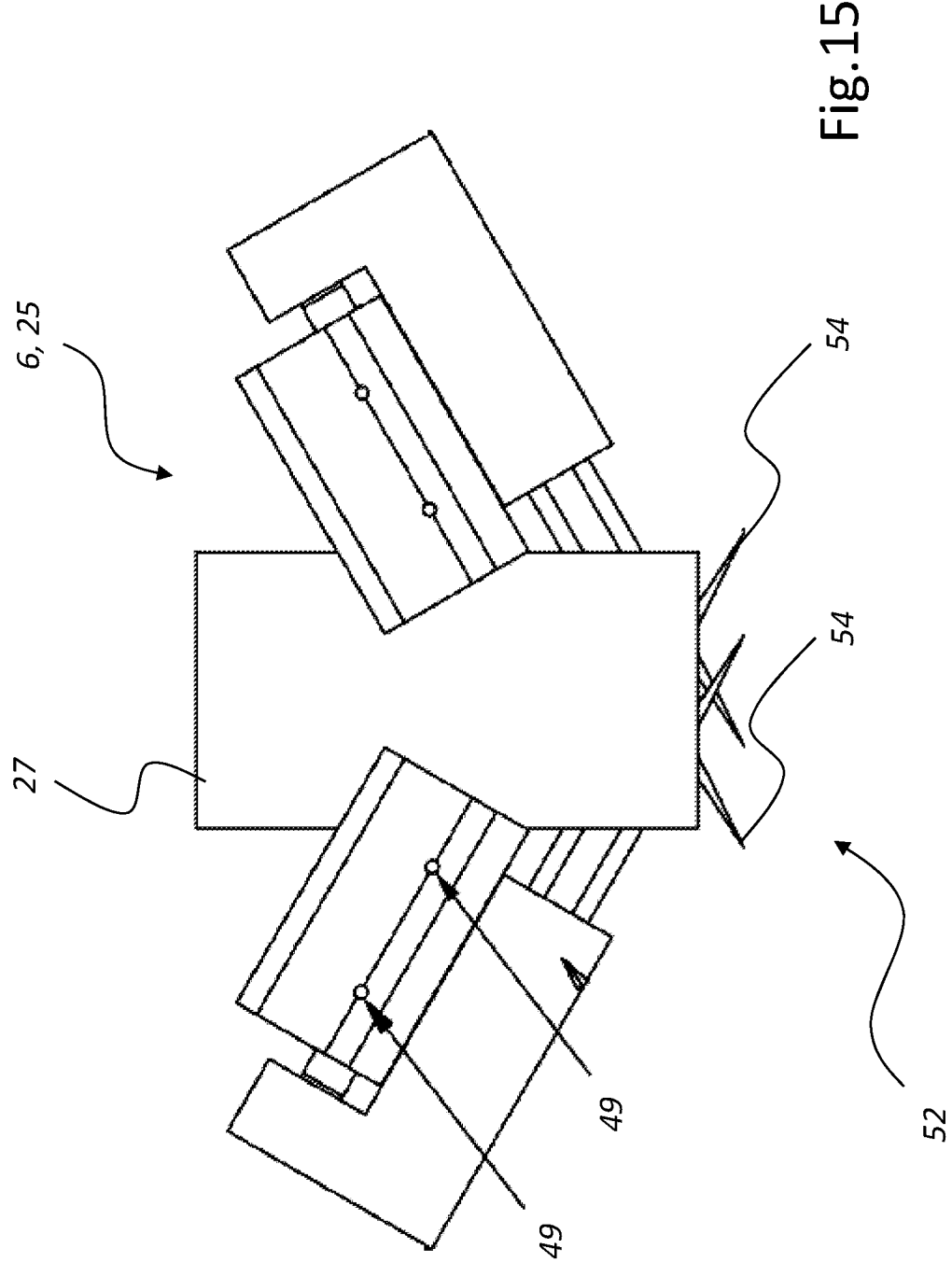

The FIG. 15 shows a schematic illustration of a further seizing unit 25 such as can be provided in various embodiments of the apparatus 1 according to the invention or of the method 100 according to the invention. The seizing unit 25 has a base 27 that can be fixedly located at a handling device. Moreover, a piercing area 52 is provided where a multitude of needles 54 is disposed. The seizing unit 25 can penetrate into a particular article 4 identified as being in a non-upright position by the piercing area 52 or by the multitude of needles 54 of the piercing area 52.

In practice, it is possible that the particular article 4 identified as being in a non-upright position is filled with liquid and thus has a high mass. This can involve problems or disturbances when extracting the article 4 identified as being in a non-upright position from the article stream 7, since the article 4 identified as being in a non-upright position can inadvertently become disengaged from the seizing unit 25 due to its high mass while it is being discharged or removed from the article stream 7.

In the exemplary embodiment of FIG. 15, the seizing unit 25 therefore has openings 49, which are in fluidic communication with further openings introduced into the multitude of needles 54, which further openings are not discernible in FIG. 15. Temporally after the seizing unit 25 has penetrated by its piercing area 52 into the particular article 4 identified as being in a non-upright position, the seizing unit 25 can discharge liquid from the particular article 4 identified as being in a non-upright position by the openings 49. After liquid has been at least partly discharged from the particular article 4 identified as being in a non-upright position, the particular article identified as being in a non-upright position can be lifted up and removed from the article stream 7 by the seizing unit 25. In this context, the article 4 identified as being in a non-upright position has a reduced mass in relation to a completely filled condition such that problems or disturbances involved with an inadvertent disengaging of the article 4 identified as being in a non-upright position from the seizing unit 25 can hereby be prevented. It should moreover be noted that the seizing unit 25 does not have to be lowered exclusively in a vertical direction toward a particular article 4 identified as being in a non-upright position for the piercing area 52 or the needles 54 of the piercing area to penetrate into the particular article 4 identified as being in a non-upright position. It is also possible that the seizing unit is moved with a horizontal direction component and is lowered in vertical direction with temporal overlap, in which context the seizing unit 25 penetrates by the piercing area 52 or by the needles 54 of the piercing area 52 into the particular article 4 identified as being in a non-upright position. In this way, the seizing unit 25 can approach the particular article 4 identified as being in a non-upright position in a direction coming diagonally from above.

Figure 16:
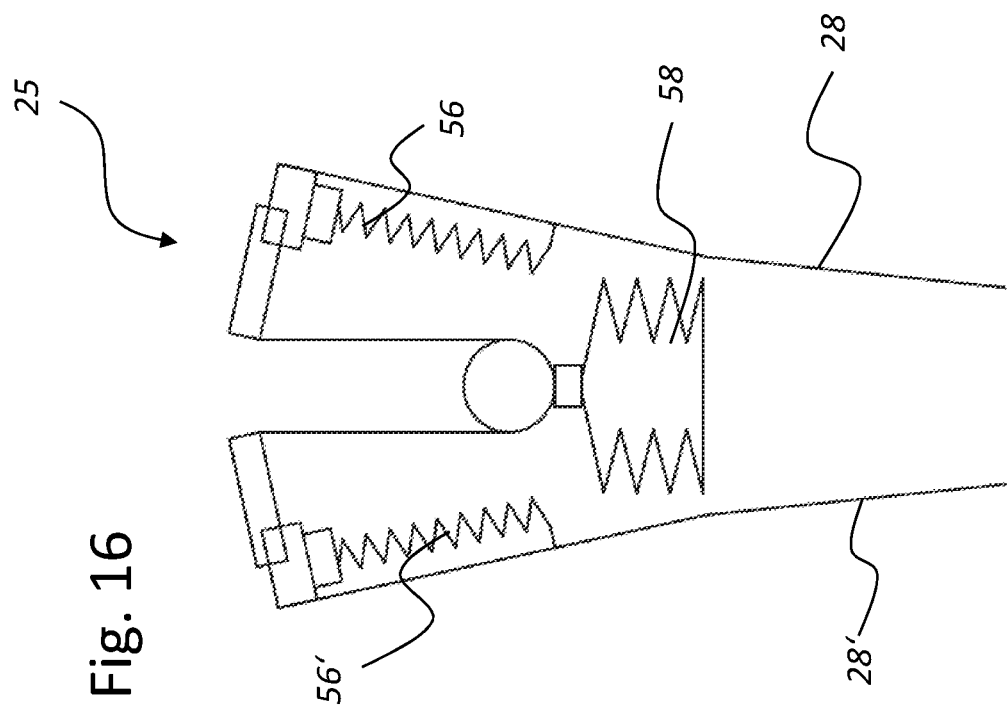

The FIG. 16 shows a schematic illustration of a further seizing unit 25 such as can be provided in various embodiments of the apparatus 1 according to the invention or of the method 100 according to the invention. The seizing unit 25 from the exemplary embodiment of FIG. 16 furthermore comprises two shanks 28 and 28' located opposite each other, by which two shanks 28 and 28' located opposite each other a particular article 4 identified as being in a non-upright position can be received in a clamping manner. Furthermore, a bellows 58 is provided that is positioned on the particular article 4 identified as being in a non-upright position when the particular article 4 identified as being in a non-upright position is received in a clamping manner. Moreover, two springs 56 and 56' form part of the seizing unit 25, with an own spring 56 and 56' being assigned to each of the two shanks 28 and 28' located opposite each other. A particular force used to receive a particular article 4 identified as being in a non-upright position in a clamping manner is supplied by the springs 56 and 56'. The springs 56 and 56' are adjustable or can be fixedly located in different positions such that a particular force, which acts upon articles 4 identified as being in a non-upright position by the seizing unit 25 and which is used to receive the particular article 4 identified as being in a non-upright position in a clamping manner, can be modified or adapted to the particular maximum cross-sectional diameter of the particular article 4 identified as being in a non-upright position. The bellows indicated by number 58 is forced-coupled with the two shanks 28 and 28' of the seizing unit 25, which shanks 28 and 28' are located opposite each other. An adjustment of the springs 56 and 56' thus in each instance involves a modification of the position of the bellows 58 in longitudinal direction of the seizing unit 25. Hereby, the seizing unit 25 can also be adapted to non-upright articles 4 of different sizes.

Figure 17:
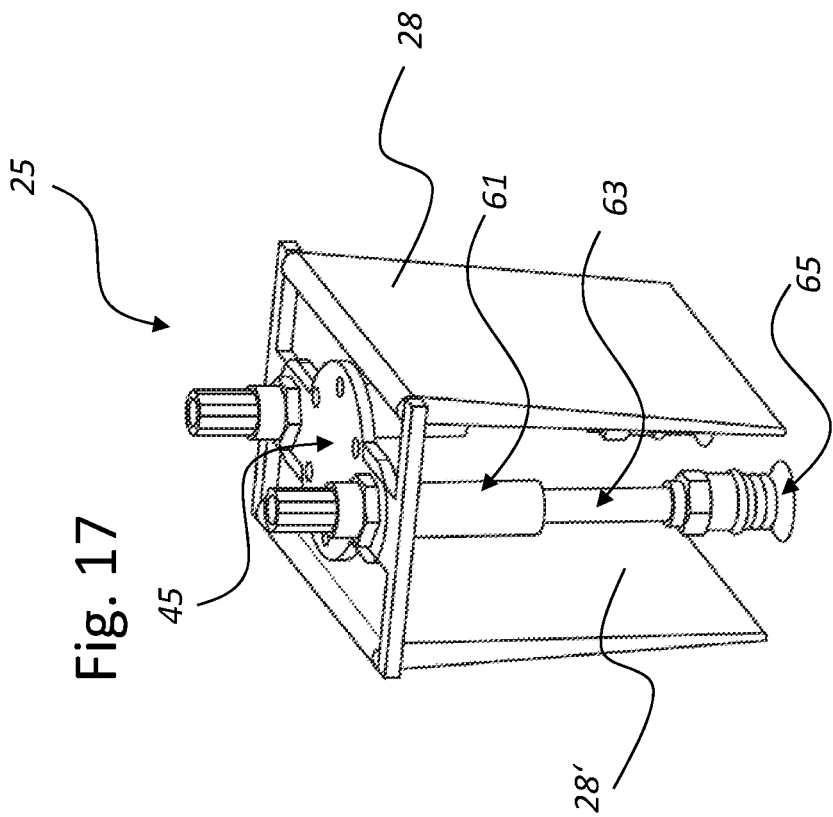

The FIG. 17 shows a schematic illustration of a further seizing unit 25 such as can be provided in various embodiments of the apparatus 1 according to the invention or of the method 100 according to the invention.

The seizing unit 25 from the exemplary embodiment of FIG. 17 has a plurality of suction heads, of which one suction head is discernible in FIG. 17 with the reference number 65. By the suction head 65, a particular article 4 identified as being in a non-upright position can be pneumatically received or pneumatically fixed to the seizing unit 25. For this purpose, the suction heads 65 are positioned coming from above on a particular article 4 identified as being in a non-upright position.

Each of the suction heads 65 has a cylinder 61 as well as a piston 63 assigned to it, with the piston 63 being adjustable along its longitudinal direction in the cylinder. In this way, it is possible to specify or adjust a particular position for the suction head depending on a particular geometry or dimension of an article 4 to be received and identified as being in a non-upright position.

The seizing unit moreover has two shanks 28 and 28' located opposite each other. The two shanks 28 located opposite each other can each be swiveled about a horizontally oriented axis. By a particular swiveling movement of the two shanks 28 located opposite each other, upright articles 3 that are immediately adjacent to the particular article 4 identified as being in a non-upright position can be shifted in opposite direction to the particular article 4 identified as being in a non-upright position. Hereby, the risk of an inadvertent tilting is minimized for these upright articles 3. The swiveling of the two shanks 28 and 28' located opposite each other can be carried out with the help of at least one pneumatic actuator, which is not illustrated in FIG. 17.

Number 45 furthermore indicates a flange, by which the seizing unit 25 can be fixedly located at a corresponding counter flange of a handling device not illustrated here.

The FIG. 19 shows a flowchart of individual steps such as can be provided in an embodiment of the method 100 according to the invention. At least one non-upright article 4 in an article stream 7 is accordingly identified as an error in a first step. It is in particular possible that the at least one non-upright article 4 in the article stream 7 is identified as an error with the help of a camera system 14 or of a control unit and/or regulating unit that is in communication with the camera system 14.

In the context of a further step, a defined action is exerted upon the at least one article identified as being in a non-upright position and/or upon further, upright articles 3 of the article stream 7, the defined action being aimed at preventing disturbances in a temporally following correction step or in a correction step temporally following the defined action. The defined action can be exerted, in particular, by a preparation 6 such as has been illustrated or described in preceding figures of the present patent application.

A further step provides the performance of a correction step to resolve the error, the correction step consisting of a removal from the article stream 7 of the at least one article 4 identified as being in a non-upright position, or of a transfer to an upright orientation of the particular at least one article 4 identified as being in a non-upright position. It is possible that the at least one article 4 identified as being in a non-upright position is discharged in the context of the removal from the article stream 7. The correction step to resolve the error can be performed, in particular, with the help of a seizing unit 25 such as is illustrated or described in preceding figures and in the following FIG. 20 of the present patent application.

FIG. 20 shows an exemplary embodiment of a seizing unit 25 such as can in each instance be provided to prevent disturbances in various embodiments of the apparatus 1 according to the invention as well as in various embodiments of the method 100 according to the invention (cf. FIG. 19).

The seizing unit 25 from the exemplary embodiment of FIG. 20 comprises two shanks 28 and 28' located opposite each other, by which two shanks 28 and 28' located opposite each other the article 4 identified as being in a non-upright position can be received in a clamping manner. The two shanks 28 and 28' located opposite each other each have a first wing 51 and a second wing 51'. The particular first wing 51 is connected to the particular second wing 51' of the particular shank 28 or 28' by a particular joint 53 such that the particular first wing 51 can be swiveled relative to the particular second wing 51' of the particular shank 28 or 28' by the particular joint 53. The first wing 51 and the second wing 51' of the shank illustrated in FIG. 20 with the reference number 28' have performed such a swiveling movement in relation to each other, whereas the first wing 51 and the second wing 51' of the shank illustrated in FIG. 20 with the reference number 28 have not been swiveled in relation to one another and thus continue to be disposed in an initial position.

Advantageously, the seizing unit 25 can adapt flexibly to its particular vicinity by such a swiveling movement of wings 51 or 51' when receiving a particular article 4 identified as being in a non-upright position. FIG. 20 shows an end section of a guide rail 42 facing toward the third conveyor section 30 according to FIG. 1. The end section of the guide rail 42 tapers toward the third conveyor section 30 (cf. FIG. 1) and is hereby formed as infeed point 46. The shank 28 is in surface contact with the guide rail 42 or with the infeed point 46 when receiving the article 4 identified as being in a non-upright position. As a result of the surface contact, the wings 51 and 51' of the shank 28 have been swiveled relative to each other such that the shank 28 can flexibly adapt to the guide rail 42 disposed in the vicinity of the seizing unit 25 or can flexibly adapt to the infeed point 46 disposed in the vicinity of the seizing unit 25. The flexible design of the shanks 28 and 28' allows the receiving of a particular article 4 identified as being in a non-upright position to be carried out in a targeted and problem-free manner even if there are obstacles in the proximity of the particular article 4 identified as being in a non-upright position.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

1 Apparatus
3 Article, upright article

4 Non-upright article, article identified as being in a non-upright position, irregularly oriented article, article identified as being irregularly oriented
5 Beverage container
6 Preparation
7 Article stream
8 Horizontal conveying device
9 Curve
10 First conveyor section
11 Molded part
12 Detection device
14 Camera system
20 Second conveyor section
21 Counter support
22 Separator element
23 Support element
25 Seizing unit
26 Ball joint
27 Base
28 Shank
29 Receptacle
30 Third conveyor section
31 Rotor
32 Clamping element and/or gripping element
33 Unmanned aircraft
34 Drone
35 Rope system
36 Tip
37 Rod-shaped carrier
38 Convexly curved portion
39 Spring mechanism
40 Fourth conveyor section
41 Gripper
42 Guide rail
43 Support plate
44 Carrier plate
45 Flange
46 Infeed point
47 Air cushion
48 Bottom portion (seizing unit 25)
49 Opening
50 Fifth conveyor section
51 First wing
51' Second wing
52 Piercing area
53 Joint
54 Needle
56 Pressure spring
58 Bellows
61 Cylinder
63 Piston
65 Suction head
71 First lot (article stream 7)
72 Second lot (article stream 7)
100 Method
S Control unit and/or regulating unit
TR Transport direction

The invention claimed is:

1. A method (100) used to handle irregularly aligned beverage container (5) of an article stream (7) comprising:
identifying at least one irregularly aligned beverage container (5) in an article stream (7) as an error;
correcting to resolve the error, the correcting step comprising removing from the article stream (7) the at least one irregularly aligned beverage container (5) previously identified, or transferring to a regular orientation of the particular at least one irregularly aligned beverage container (5) previously identified; and
exerting a defined action temporally before or in temporal overlap with the correcting step upon the at least one irregularly aligned beverage container (5) previously identified or upon regularly conveyed at least one article (3) of the article stream (7),
wherein the exerting step comprises undoing or reducing an abutment or contact between the at least one irregularly aligned beverage container (5) and at least one regularly conveyed article (3) of the article stream (7) by guiding the article stream (7) with the at least one irregularly aligned articles over a plurality of horizontal conveying devices (8), and controlling the plurality of horizontal conveying devices (8) in a coordinated manner to undo or reduce the abutment or contact between the at least one irregularly aligned beverage container (5) and the at least one regularly conveyed article (3) of the article stream (7).

2. The method of claim 1, comprising guiding the article stream (7) with the at least one irregularly aligned beverage container (5) over at least one horizontal conveying device (8) that is operated at reduced conveying speed or stopped temporally while performing the exerting step.

3. The method of claim 1, wherein the exerting step further comprises rotating the at least one irregularly aligned beverage container (5) about an axis that is approximately perpendicular to the ground.

4. The method of claim 1, wherein the exerting step further comprises inclining at least one regularly conveyed (3) of the article stream (7) in relation to the at least one irregularly aligned beverage container (5).

5. The method of claim 1, wherein the exerting step further comprises dipping at least one separator element (22) between the at least one irregularly aligned beverage container (5) and at least one regularly conveyed article (3) of the article stream (7), wherein at least one regularly conveyed article (3) is immediately adjacent to the at least one irregularly aligned beverage container (5).

6. The method of claim 5, wherein the exerting step comprises decelerating or accelerating the at least one regularly conveyed article (3) temporally after the dipping step.

7. The method of claim 1, wherein the exerting step further comprises applying a vibration to the at least one irregularly aligned beverage container (5).

8. The method of claim 1, wherein exerting step further comprises pushing the at least one irregularly aligned beverage container (5) in an upward direction by compressed air and thus removes the acted upon at least one irregularly aligned beverage container (5) from the article stream (7).

9. The method of claim 1, wherein the exerting step further comprises forming at least one opening formed along a transport path for the article stream (7) through which opening the at least one irregularly aligned beverage container (5) falls and thus removes the at least one irregularly aligned beverage container (5) from the article stream (7).

10. A method (100) used to handle irregularly aligned beverage container (5) of an article stream (7) comprising:
identifying at least one irregularly aligned beverage container (5) in an article stream (7) as an error;
correcting to resolve the error, the correcting step comprising removing from the article stream (7) the at least one irregularly aligned beverage container (5) previously identified, or transferring to a regular orientation of the particular at least one irregularly aligned beverage container (5) previously identified; and exerting a defined action temporally before or in temporal overlap with the correcting step upon the at least one irregularly aligned beverage container (5) previously identified or upon regularly conveyed at least one article (3) of the article stream (7), wherein the exerting step comprises discharging, with at least one seizing unit (25) comprising at least two shanks (28, 28') located opposite each other, the at least one irregularly aligned beverage container (5) from the article stream (7) by lifting the at least one irregularly aligned beverage container (5), wherein the discharging step comprises dipping the at least one seizing unit (25) into the article stream (7) to receive the at least one irregularly aligned beverage container (5), and then increasing the distance between the at least two shanks (28, 28') to move away an adjacent regularly conveyed article (3), and then decreasing the distance between the at least two shanks (28, 28') to clasp the at least one irregularly aligned beverage container (5).

11. The method of claim 10, wherein the at least one seizing unit (25), during lifting the at least one irregularly aligned beverage container (5), supports a regularly conveyed article (3) that immediately succeeds or precedes, in the movement direction of the article stream (7), the lifted article.

12. The method of claim 11, wherein the seizing unit (25) clasps the at least one irregularly aligned beverage container (5).

13. The method of claim 12, wherein the at least one seizing unit (25) comprises an air cushion (47).

14. The method of claim 10, wherein the at least one seizing unit (25) is suspended from a gantry system and is moved along the gantry system.

15. The method of 10, wherein the at least one seizing unit (25) is moved by a parallel kinematic robot.

16. The method of claim 10, wherein the at least one seizing unit (25) is moved by a rope system (35).

17. The method of claim 10, in which the at least one seizing unit (25) is moved by at least one unmanned aircraft (33).

18. The method of claim 10, wherein at least one seizing unit (25) is swivelably movable by a ball joint (26).

19. The method of claim 10, wherein the exerting step further comprises:
rotating the at least one irregularly aligned beverage container (5) about an axis that is approximately perpendicular to the ground,
inclining at least one regularly conveyed (3) of the article stream (7) in relation to the at least one irregularly aligned beverage container (5),
dipping at least one separator element (22) between the at least one irregularly aligned beverage container (5) and at least one regularly conveyed article (3) of the article stream (7), wherein at least one regularly conveyed article (3) is immediately adjacent to the at least one irregularly aligned beverage container (5),
applying a vibration to the at least one irregularly aligned beverage container (5),
pushing the at least one irregularly aligned beverage container (5) in an upward direction by compressed air and thus removes the acted upon at least one irregularly aligned beverage container (5) from the article stream (7), or
at least one opening formed along a transport path for the article stream (7) through which opening the at least one irregularly aligned beverage container (5) falls and thus removes the at least one irregularly aligned beverage container (5) from the article stream (7).

20. A method (100) used to handle irregularly aligned beverage container (5) of an article stream (7) comprising:
identifying at least one irregularly aligned beverage container (5) in an article stream (7) as an error;
correcting to resolve the error, the correcting step comprising removing from the article stream (7) the at least one irregularly aligned beverage container (5) previously identified, or transferring to a regular orientation of the particular at least one irregularly aligned beverage container (5) previously identified; and
exerting a defined action temporally before or in temporal overlap with the correcting step upon the at least one irregularly aligned beverage container (5) previously identified or upon regularly conveyed at least one article (3) of the article stream (7),
wherein the exerting step comprises discharging, with at least one seizing unit (25) comprising at least two shanks (28, 28') located opposite each other, the at least one irregularly aligned beverage container (5) from the article stream (7) by lifting the at least one irregularly aligned beverage container (5),
wherein the at least one seizing unit (25) penetrates into the at least one irregularly aligned beverage container (5).

21. The method of claim 20, wherein the at least one seizing unit (25), during lifting the at least one irregularly aligned beverage container (5), supports a regularly conveyed article (3) that immediately succeeds or precedes, in the movement direction of the article stream (7), the lifted article.

22. The method of claim 21, wherein the seizing unit (25) clasps the at least one irregularly aligned beverage container (5).

23. The method of claim 22, wherein the at least one seizing unit (25) comprises an air cushion (47).

24. The method of claim 20, wherein the exerting step further comprises:
rotating the at least one irregularly aligned beverage container (5) about an axis that is approximately perpendicular to the ground,
inclining at least one regularly conveyed (3) of the article stream (7) in relation to the at least one irregularly aligned beverage container (5),
dipping at least one separator element (22) between the at least one irregularly aligned beverage container (5) and at least one regularly conveyed article (3) of the article stream (7), wherein at least one regularly conveyed article (3) is immediately adjacent to the at least one irregularly aligned beverage container (5), or
applying a vibration to the at least one irregularly aligned beverage container (5),
pushing the at least one irregularly aligned beverage container (5) in an upward direction by compressed air and thus removes the acted upon at least one irregularly aligned beverage container (5) from the article stream (7), or
at least one opening formed along a transport path for the article stream (7) through which opening the at least one irregularly aligned beverage container (5) falls and thus removes the at least one irregularly aligned beverage container (5) from the article stream (7).

25. The method of claim 20, wherein the at least one seizing unit (25) is suspended from a gantry system and is moved along the gantry system, is moved by a parallel kinematic robot, is moved by a rope system (35, is moved by at least one unmanned aircraft (33), or is swivelably movable by a ball joint (26).

\* \* \* \* \*